(12) United States Patent
Deboy et al.

(10) Patent No.: US 10,985,661 B2
(45) Date of Patent: Apr. 20, 2021

(54) INTERIM POWER SOURCE SYSTEM AND METHOD

(71) Applicant: Infineon Technologies Austria AG, Villach (AT)

(72) Inventors: Gerald Deboy, Klagenfurt (AT); Ernst Katzmaier, Villach (AT); Francesco Didomenico, Villach (AT)

(73) Assignee: INFINEON TECHNOLOGIES AUSTRIA AG, Villach (AT)

( * ) Notice: Subject to any disclaimer, the term of this patent is extended or adjusted under 35 U.S.C. 154(b) by 138 days.

(21) Appl. No.: 15/152,036

(22) Filed: May 11, 2016

(65) Prior Publication Data

US 2016/0342182 A1 Nov. 24, 2016

Related U.S. Application Data

(60) Provisional application No. 62/163,726, filed on May 19, 2015.

(51) Int. Cl.
| | |
|---|---|
| *G06F 1/30* | (2006.01) |
| *H02M 3/335* | (2006.01) |
| *G06F 1/28* | (2006.01) |
| *H02M 1/00* | (2006.01) |

(52) U.S. Cl.
CPC .......... *H02M 3/33507* (2013.01); *G06F 1/28* (2013.01); *G06F 1/305* (2013.01); *H02M 2001/0032* (2013.01); *Y02B 70/10* (2013.01)

(58) Field of Classification Search
CPC .................................... G06F 1/28; G06F 1/30
See application file for complete search history.

(56) References Cited

U.S. PATENT DOCUMENTS

| | | | |
|---|---|---|---|
| 5,909,360 A | 6/1999 | Lavin et al. | |
| 7,696,643 B1 | 4/2010 | Jai et al. | |
| 8,193,662 B1 * | 6/2012 | Carlson | H02J 9/061 |
| | | | 307/23 |
| 8,732,506 B2 | 5/2014 | Nishtala et al. | |
| 2006/0139965 A1 | 6/2006 | Gan et al. | |
| 2011/0064445 A1 * | 3/2011 | Yashiro | G03G 15/5004 |
| | | | 399/88 |

(Continued)

FOREIGN PATENT DOCUMENTS

| | | |
|---|---|---|
| CN | 1643768 A | 7/2005 |
| CN | 101043145 A | 9/2007 |
| CN | 101071951 A | 11/2007 |

(Continued)

OTHER PUBLICATIONS

Kontorinis, V. et al., "Managing Distributed UPS Energy for Effective Power Capping in Data Centers", 39th Annual International Symposium on Computer Architecture, pp. 488-499, Jun. 9-13, 2012.

(Continued)

*Primary Examiner* — Paul Yen
*Assistant Examiner* — Eric Chang
(74) *Attorney, Agent, or Firm* — Slater Matsil, LLP

(57) ABSTRACT

A method for power control includes determining a load power of a load coupled to an output of an isolated AC/DC power supply. The method also includes, when the determined load power is less than a first threshold load power, providing the load power to the load from an interim power source.

15 Claims, 17 Drawing Sheets

(56) References Cited

U.S. PATENT DOCUMENTS

2013/0257160 A1    10/2013   Harris et al.

FOREIGN PATENT DOCUMENTS

| CN | 201072850 Y | 6/2008 |
| CN | 102097854 A | 6/2011 |
| CN | 102207766 A | 10/2011 |
| CN | 103051042 A | 4/2013 |
| EP | 2333930 A2 | 6/2011 |
| WO | 03079529 A1 | 9/2003 |

OTHER PUBLICATIONS

Abdel-Rahman, S. "Resonant LLC Converter: Operation and Design 250W 33Vin 400Vout Design Example", Infineon Technologies North America Corp., AN Sep. 2012 V.1.0, 19 Pages, Sep. 2012.
Infineon Technologies, ICE2HS01G Data Sheet, "High Performance Resonant Mode Controller", V2.1, 29 pages, May 24, 2011.

* cited by examiner

INTERIM POWER SOURCE SYSTEM AND METHOD

This application claims the benefit of U.S. Provisional Application No. 62/163,726, filed on May 19, 2015, which application is hereby incorporated herein by reference in its entirety.

TECHNICAL FIELD

The present invention relates generally to a system and method for supplying power, and in particular embodiments, to an interim power source system and method.

BACKGROUND

Power supply systems convert input power to output load power by, for example, converting between Alternating Current (AC) and Direct Current (DC) or by changing a voltage level. For some of these power supply systems, a nominal voltage level that is expected of the input power may correspond to a standardized voltage level provided by an input power source connected to the power supply system. Examples of input power sources include AC and High Voltage DC (HVDC) transmission systems, batteries, fuel cells, generators, alternators, solar power converters, other power supply systems, etc.

Components of various power supply systems may include isolating components having outputs with low electrical dependence on their inputs, voltage-regulated components having an acceptable range of voltages at their outputs despite varying output currents or input voltages, and embedded components.

Electrical loads drawing load power from the power supply system may include, for example, domestic appliances, office equipment, industrial machinery, or a server computer that hosts software applications to support tasks in a network data center.

SUMMARY OF THE INVENTION

In accordance with a first example embodiment of the present invention, a method for power control is provided. The method includes determining a load power of a load coupled to an output of an isolated AC/DC power supply, and when the determined load power is less than a first threshold load power, providing the load power to the load from an interim power source.

In accordance with a second example embodiment of the present invention, a method for controlling a power supply is provided. The method includes determining an input voltage of the power supply. The method also includes, when the determined input voltage of the power supply is less than a first threshold voltage and is not less than a second threshold voltage, providing load power to a load at the same time from both the power supply and an interim power source.

In accordance with a third example embodiment of the present invention, a device is provided. The device includes an isolated AC/DC power supply including an output coupled to an external load. The device also includes a control circuit configured for determining a load power of the external load, and when the determined load power is less than a first threshold load power, providing the load power to the external load from an interim power source. In accordance with a fourth example embodiment of the present invention, a system for power control is provided.

The system includes a primary-side circuit, including an input coupled to an input voltage, a secondary-side circuit including an output coupled to an external load. The secondary-side circuit further includes a battery and a first microcontroller. The system also includes an AC/DC power supply disposed in the same mechanical housing as the battery. The AC/DC power supply includes a first transformer that couples power from the primary-side circuit to the secondary-side circuit. The first microcontroller includes a sensing input coupled to an output of the battery and to the output of the secondary-side circuit.

DETAILED DESCRIPTION OF ILLUSTRATIVE EMBODIMENTS

Figure 1A:
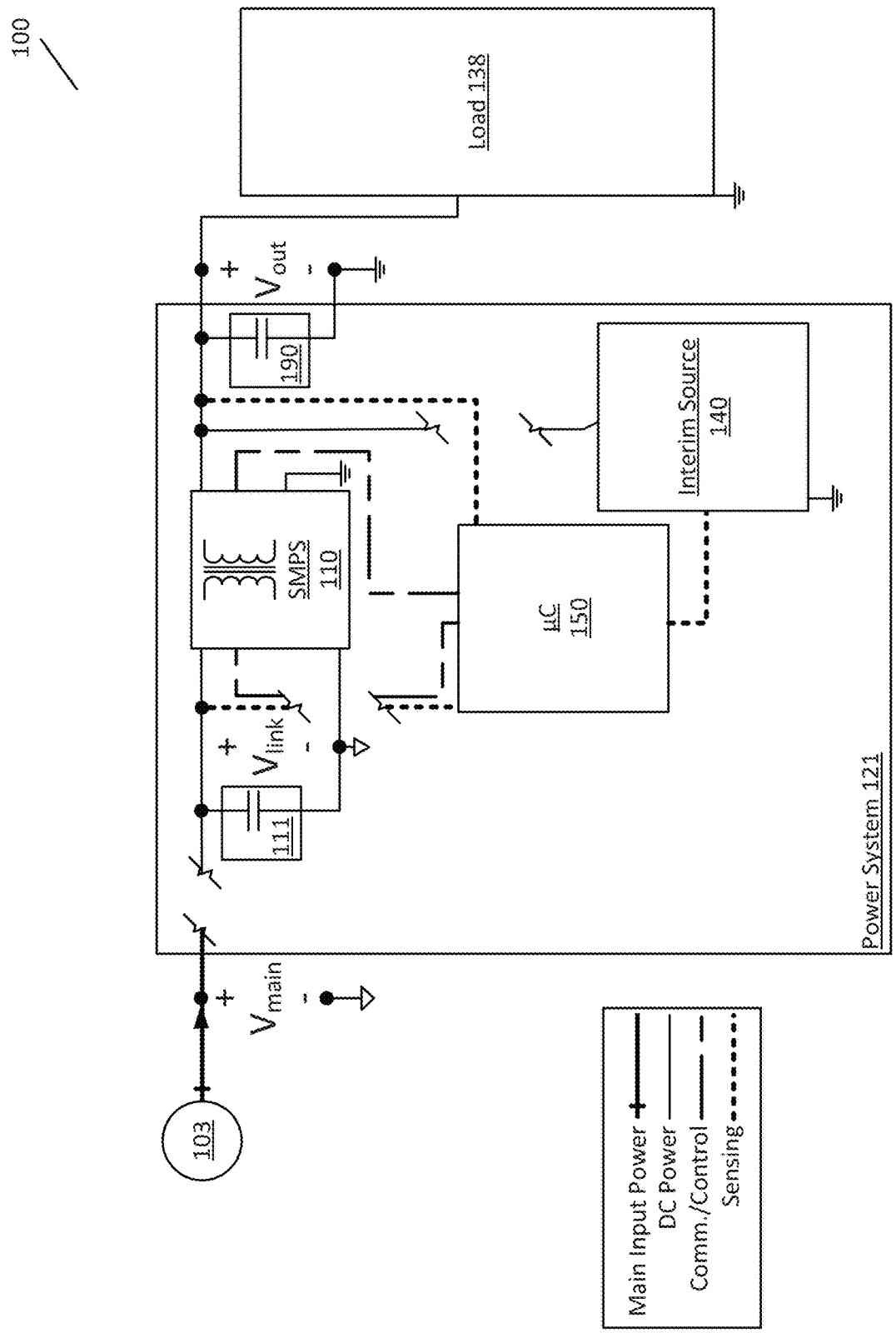
FIG. 1A is a block diagram illustrating a power configuration that includes an interim, interruption-resistant source in accordance with one of a number of embodiments.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, systems and methods for power systems using a supplemental, interruption-resistant, interim power source. Embodiments of the present invention may also be applied to other circuits including, but not limited to switched-mode power supplies and other types of power supply systems.

In various embodiments, a power system has a main power stage that includes a Switched-Mode Power Supply (SMPS) used to convert power from an AC power line to a DC load power suitable, for example, to provide power to a computer server system including processors and disk drives. In order to ensure that the server system remains functional during short interruptions in the AC power line, including a so-called brownout where the line voltage is momentarily reduced, as well as the complete loss of power, a supplemental, interruption-resistant power source of an interim power stage may be provided to supplement a main power conversion system. Such interim sources may include, for example, batteries that may be switchably coupled to the DC output of the main power system. During operation, when a loss of AC line voltage is detected, the batteries of the interim power stage are coupled to the DC server load. In some embodiments, the main power conversion system may include multiple power supplies redundantly connected between the AC power line and the server system. In some embodiments, the interim power stage may be housed in a separate chassis from the one or more power supplies of the main power stage.

In embodiments of the present invention, batteries are integrated within the design of the overall power system to not only provide backup load power but also to provide load power when conditions arise that would otherwise cause components of the main power stage to operate inefficiently, or at high temperatures. As an example, upon a detection of a brownout condition, power to the load is provided by the battery, and one or more components of the main power stage are shut down. The integration of the batteries prevents the main power stage from increasing the amount of current used by the SMPS to compensate after a PLD. In embodiments where the main power stage includes a Power Factor Correction (PFC) stage, the integration of the batteries prevents the PFC stage from increasing the amount of current to compensate during and/or after a PLD. Preventing such increased current also prevents a corresponding increase in operating temperatures and decrease in efficiencies. In server computer embodiments, the integrated batteries may be included on a server board or within the mechanical housing of a server Power Supply Unit (PSU).

In some embodiments, batteries may also be used to provide power to the load under lightly loaded conditions to prevent stress and inefficient operation of components such as switches and diodes of a PFC or SMPS of the main power stage. In one specific example, the batteries of the interim power stage may be used to supply power to a load when the load power is less than 40% of a specified full load power, which may be specified as an average load power with some moderate safety margin. By using the batteries in such conditions, SMPS topologies such as phase-shift Zero Voltage Switching (ZVS) may be used that provide high efficiency of the main power stage at high load power conditions, but which at lightly loaded conditions provide lower efficiencies, increased EMI radiation, and increased transistor thermal stress.

In some embodiments, batteries may also be used to provide at least a portion of power to the load under highly loaded conditions to reduce the hardware requirements of the main power stage. For example, an embodiment power system may have a battery dimensioned to support all expected levels of load power above a specified "full load power" level. Full load power may be specified as, e.g., the average value of the expected load power combined with a moderate safety margin. In such embodiments where the batteries are capable of providing load power support during the entire expected interval of peak load power, hardware costs may be reduced since the main power stage may be dimensioned to full load power rather than peak load power conditions.

FIG. 1A shows an embodiment power configuration 100 that includes a power system 121 that has an Interim Source 140 and that is connected to a main input power source 103. The main input power source 103, which may be either a DC power source such as an HVDC power source or an AC power source such as a Power Distribution Unit (PDU), provides main input power with main input voltage $V_{main}$ to the power system 121. The power system 121 includes an SMPS stage 110 that provides isolation and performs regulated DC-to-DC conversion and that may be, for example, a Pulse-Width Modulation (PWM) converter, an LLC Converter, etc. The SMPS stage 110 has a link capacitor bank 111 connected across its inputs that has a DC link voltage $V_{link}$. The output of the SMPS stage 110 is connected to a DC power output of the power system 121 that provides power to a load 138.

The Interim Source 140, which may include one or more batteries, is also coupled to the DC output of the power system 121 to support the provision of DC power to the load 138. In some embodiments, the Interim Source 140 provides at least a portion of the DC power to the load even under normal voltage conditions of the main input power source 103, for example, when light or heavy load power is drawn from the load 138.

A power system output capacitor bank 190 that has a voltage $V_{out}$ is connected across the DC power output of the power system 121. This power system output capacitor bank 190 may be pre-charged during a start-up phase to the nominal voltage of $V_{out}$. In embodiments that use, for example, an LLC converter in the SMPS stage 110, this pre-charging may prevent a discharged output capacitor bank 190 from causing the SMPS stage 110 to switch at over-resonant frequencies during start-up. The pre-charging may thus allow synchronous rectification elements of the SMPS stage 110 to be more suitably selected for voltages that correspond more closely with normal operating conditions. In some embodiments, the Interim Source 140 provides the energy for pre-charging the power system output. For example, the power system output capacitor bank 190 may be charged directly from the Interim Source 190 during a start-up sequence.

A Micro-Controller (µC) 150 is coupled to the input and output of the SMPS stage 110 for communication and control such as, for example, controlling a switching rate, gain, etc. of the SMPS stage 110. In some embodiments, the Interim Source 140 has a power connection to the microcontroller 150 so that it can provide power to control the power system 121 during at least a start-up phase of the power system 121. Microcontroller 150 is also connected for sensing power and/or voltage conditions at the input of the SMPS stage 110 and at the power system output capacitor bank 190. The microcontroller 150 controls the use of the Interim Source 140 by the power system 121 to achieve desired system objectives, such as, for example, reducing a minimum hold-up time that is required during an AC/HVDC line voltage dropout or brownout condition, reducing DC link voltage variation, or reducing power system efficiency losses during light or heavy load conditions. The microcontroller 150 is also coupled to the Interim Source 140 to sense the status of the Interim Source 140, which may be, for example, a battery voltage level.

In some embodiments, a bidirectional DC-to-DC converter is coupled between the Interim Source 140 and the output of the power system 121. For example, such embodiments may couple, between the battery output and a regulated power system output having a nominal voltage of 12V, a buck/boost converter, a buck converter working as a buck from the battery output and as a boost from the power system output, an inverting buck-boost converter, etc. In other embodiments, the battery may be coupled directly to the output of the power system 121. For example, the voltage provided by a battery coupled directly at the power system output may be a fluctuating battery voltage from 9V to 14.5V instead of a stable, regulated DC rail, and the output of the power supply may act as a constant voltage source or constant current source to charge the battery. In some of these directly coupled embodiments, no-load and lightly loaded conditions may be avoided by charging the batteries.

Figure 1B:
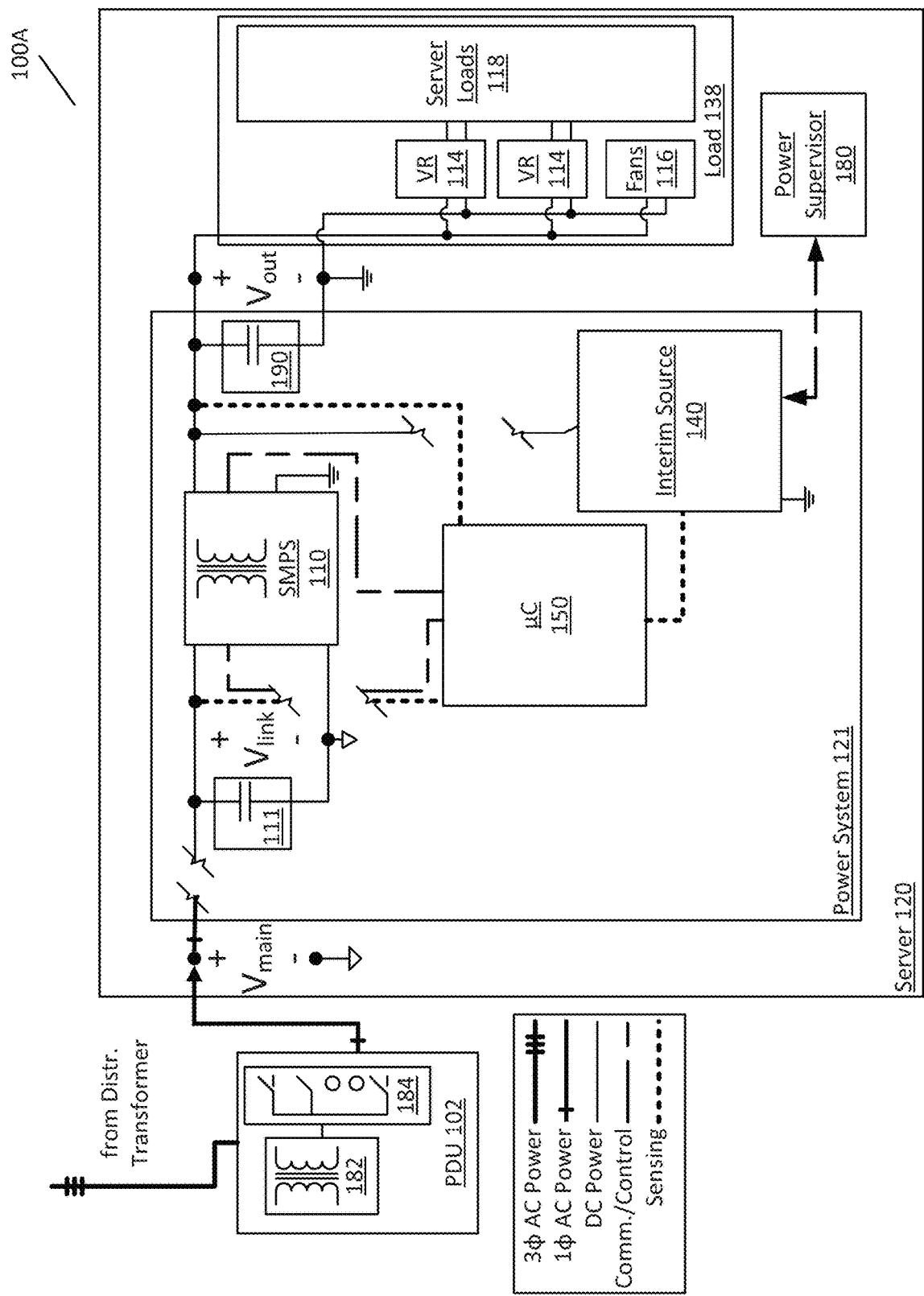
FIG. 1B is a block diagram illustrating a power configuration that includes a server in accordance with one of a number of embodiments.

FIG. 1B shows a power configuration 100A, which is an embodiment of the power configuration 100 of FIG. 1A, and which includes a server 120. The server 120 includes a Power Supervisor 180 coupled to microcontroller 150 via a bidirectional power management communication link to communicate battery status and to provide information about power flow to and from server 120. The load 138 includes Voltage Regulators (VRs) 114, fans 116, and server loads 118 that may be, for example, server computer blades. The main input power source 103 is implemented in embodiment 100A as a PDU 102 receiving three-phase AC power from a distribution transformer, and this PDU 102 may include a step-down transformer 182 and distribution panels 184.

Figure 1C:
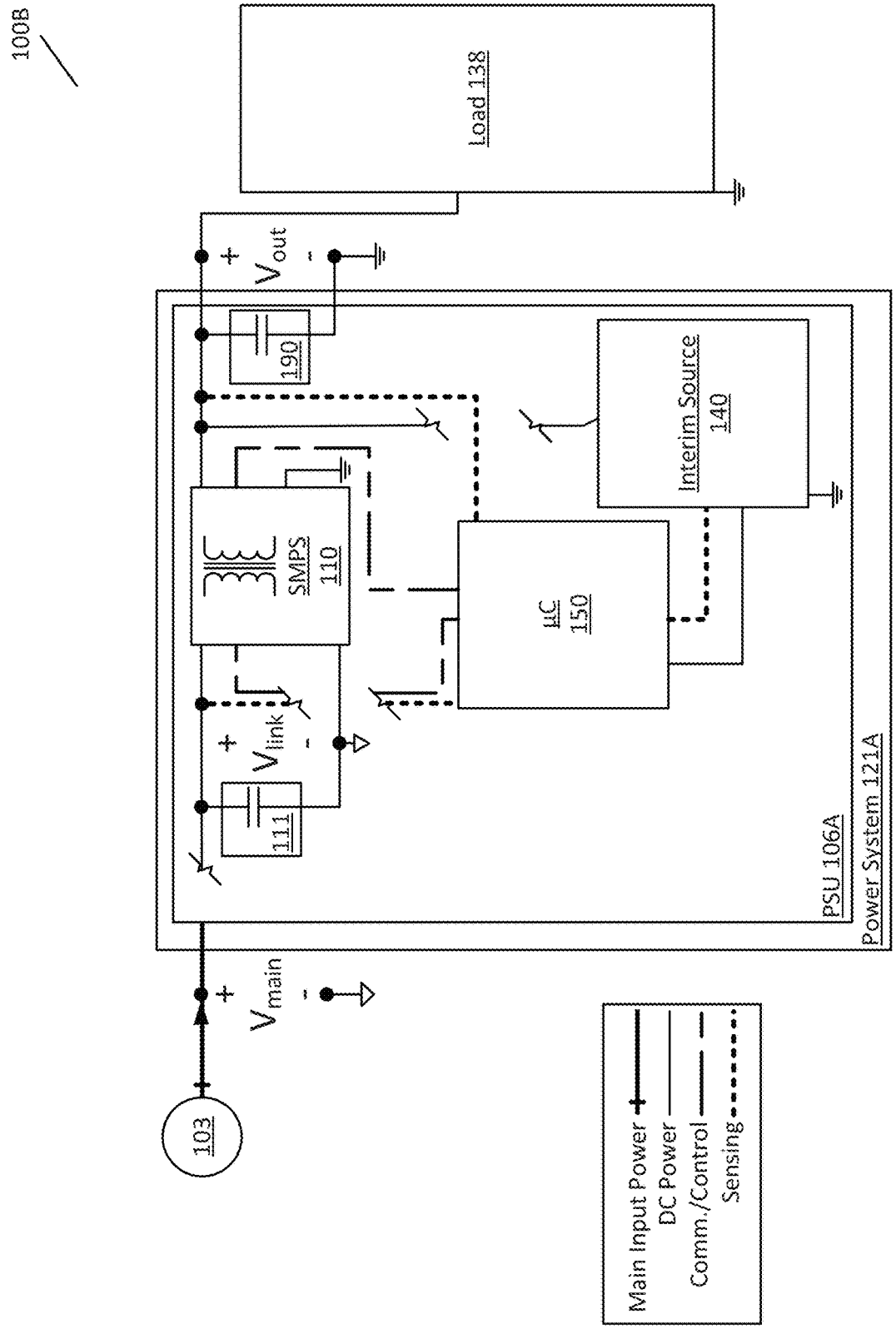
FIG. 1C is a block diagram illustrating a power configuration in which both a microcontroller and the interim source are included in a Power Supply Unit (PSU) in accordance with one of a number of embodiments.

FIG. 1C shows a power configuration 100B that is an embodiment of the power configuration 100 in which both the microcontroller 150 and the Interim Source 140 are included in a PSU 106A that has its own mechanical housing. The PSU 106A is coupled between main power input and DC power output of power system 121A. The Interim Source 140 has a power connection to the microcontroller 150 so that it can provide power to control the PSU 106A during at least a start-up phase of the PSU 106A.

Figure 1D:
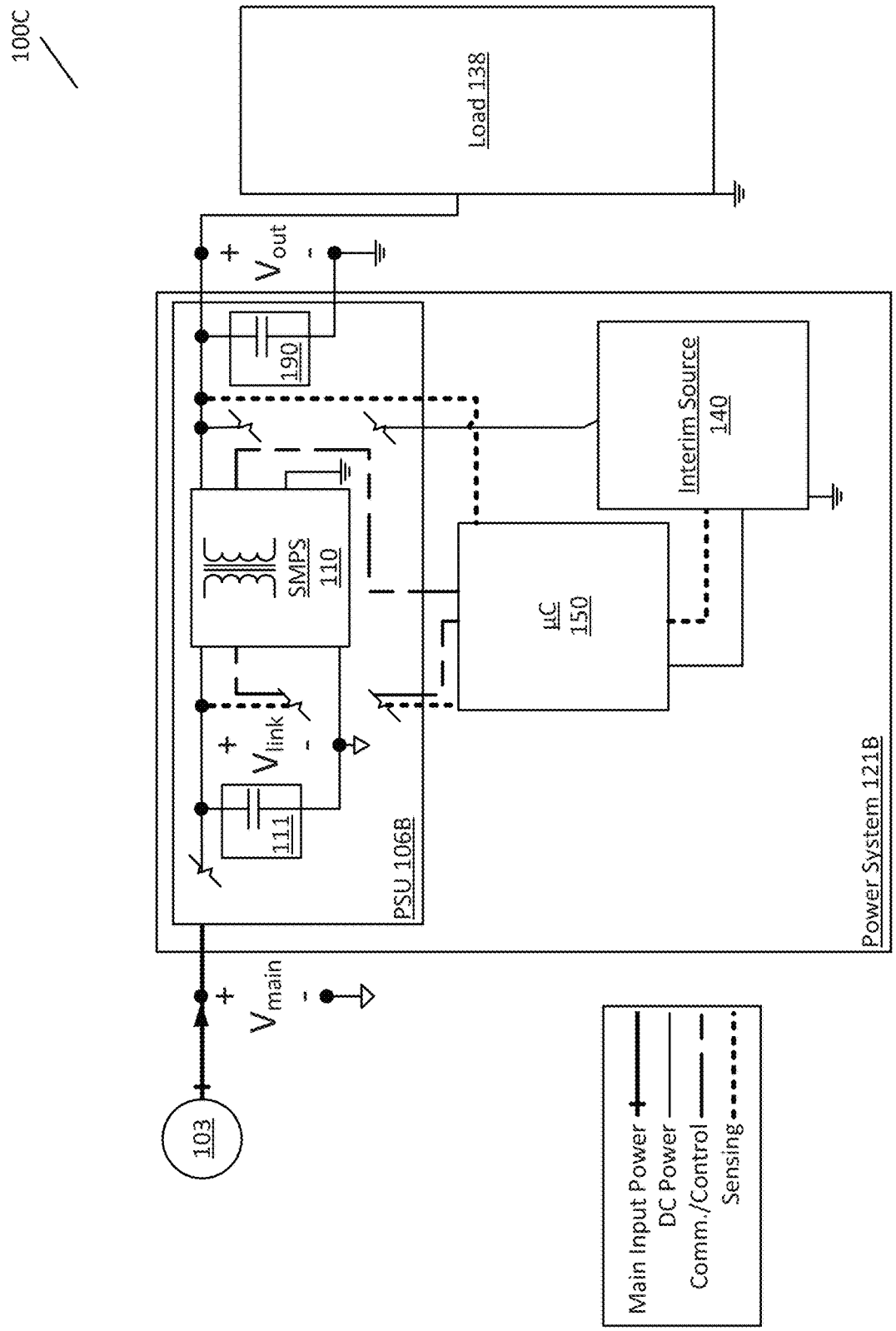
FIG. 1D is a block diagram illustrating a power configuration in which both the microcontroller and the interim source are external to a PSU in accordance with one of a number of embodiments.

FIG. 1D shows a power configuration 100C that is an alternative embodiment of the power configuration 100 of FIG. 1A in which both the microcontroller 150 and the Interim Source 140 are external to the mechanical housing of a PSU 106B. The microcontroller 150 controls the operation of the PSU 106B, and the Interim Source 140 provides power to the microcontroller 150 during at least a start-up phase of power system 121B. The Interim Source 140 has a power connection to provide power to the DC output of the power system 121B, and the Interim Source 140 may also power one or more internal components of the PSU 106. In other embodiments, Interim Source 140 is an internal component of the PSU while microcontroller 150 is external to the PSU. In still other embodiments, Interim Source 140 is external to the PSU while microcontroller 150 in an internal component of the PSU.

Figure 2A:
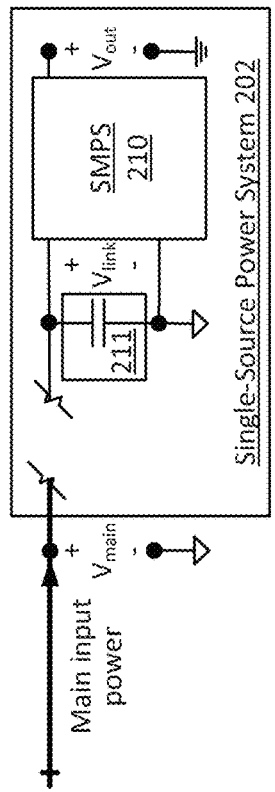
FIG. 2A is a block diagram illustrating an example single-source power system that achieves a hold-up time.

FIGS. 2A-2E help illustrate the effect of the Interim Source 140 on required hold-up time, thermal dissipation, and link capacitance by showing the effect of a main input power dropout on an example single-source power system 202 that does not include an Interim Source 140. Referring to FIG. 2A, single-source power system 202, which achieves a hold-up time of, e.g., 20 milliseconds, receives main input power having a voltage $V_{main}$. The power system 202 has a DC output voltage $V_{out}$. A DC link voltage $V_{link}$ is the voltage across a link capacitor bank 211 connected across the inputs of a SMPS stage 210 of the single-source power system 202, and this DC link voltage has a nominal voltage of $V_{link\_nom}$ and a minimum specified voltage of $V_{link\_min}$.

Figure 2B:
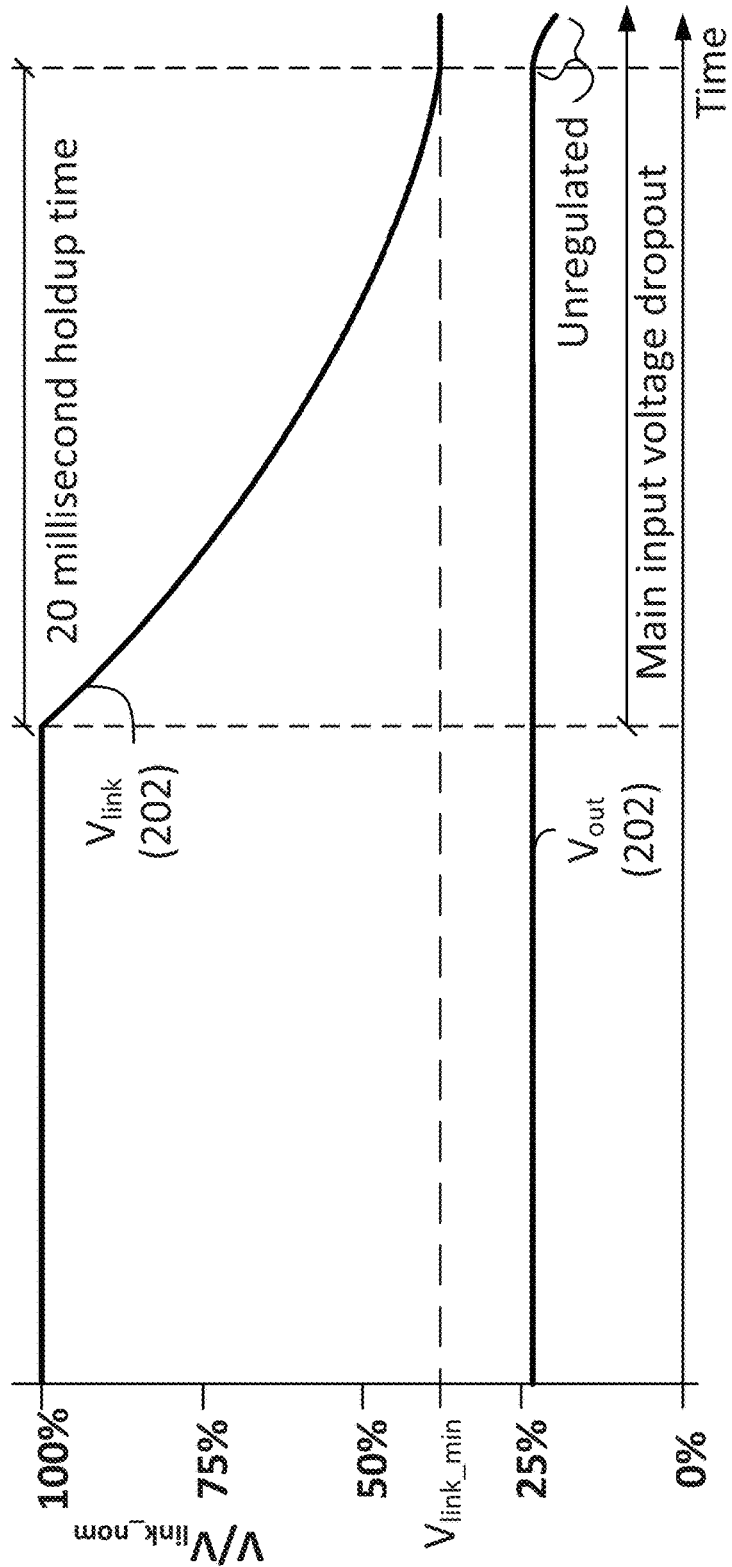
FIG. 2B is a graph showing a DC link voltage and output voltage of the example single-source power system during a dropout of the main input voltage.

Referring now to FIG. 2B, the ratios of $V_{link}$ and $V_{out}$ relative to $V_{link\_nom}$ for single-source power system 202 are plotted against time during an exemplary dropout of the main input voltage $V_{main}$. At first, a normal operating condition occurs from 0 to 20 milliseconds, during which $V_{link}$ of single-source power system 202 is maintained near its nominal value, and $V_{out}$ of single-source power system 202 is maintained at a constant fraction of $V_{link\_nom}$. In this example, a dropout of the main input voltage $V_{main}$ occurs at 20 milliseconds and continues thereafter. Accordingly, $V_{link}$ begins to decay at about 20 milliseconds. From about 20 milliseconds to about 40 milliseconds, $V_{link}$ has not yet decayed below $V_{link\_min}$, and thus $V_{out}$ is regulated by SMPS stage 210 to be maintained at the constant fraction of $V_{link\_nom}$. Since power system 202 only achieves a holdup time of about 20 milliseconds, however, in the example of FIG. 2B after a time of about 40 milliseconds has expired, $V_{link}$ has decayed below $V_{link\_min}$. Thus $V_{out}$ is no longer regulated by SMPS stage 210 and is allowed to drop below the constant fraction of $V_{link\_nom}$.

Figure 2C:
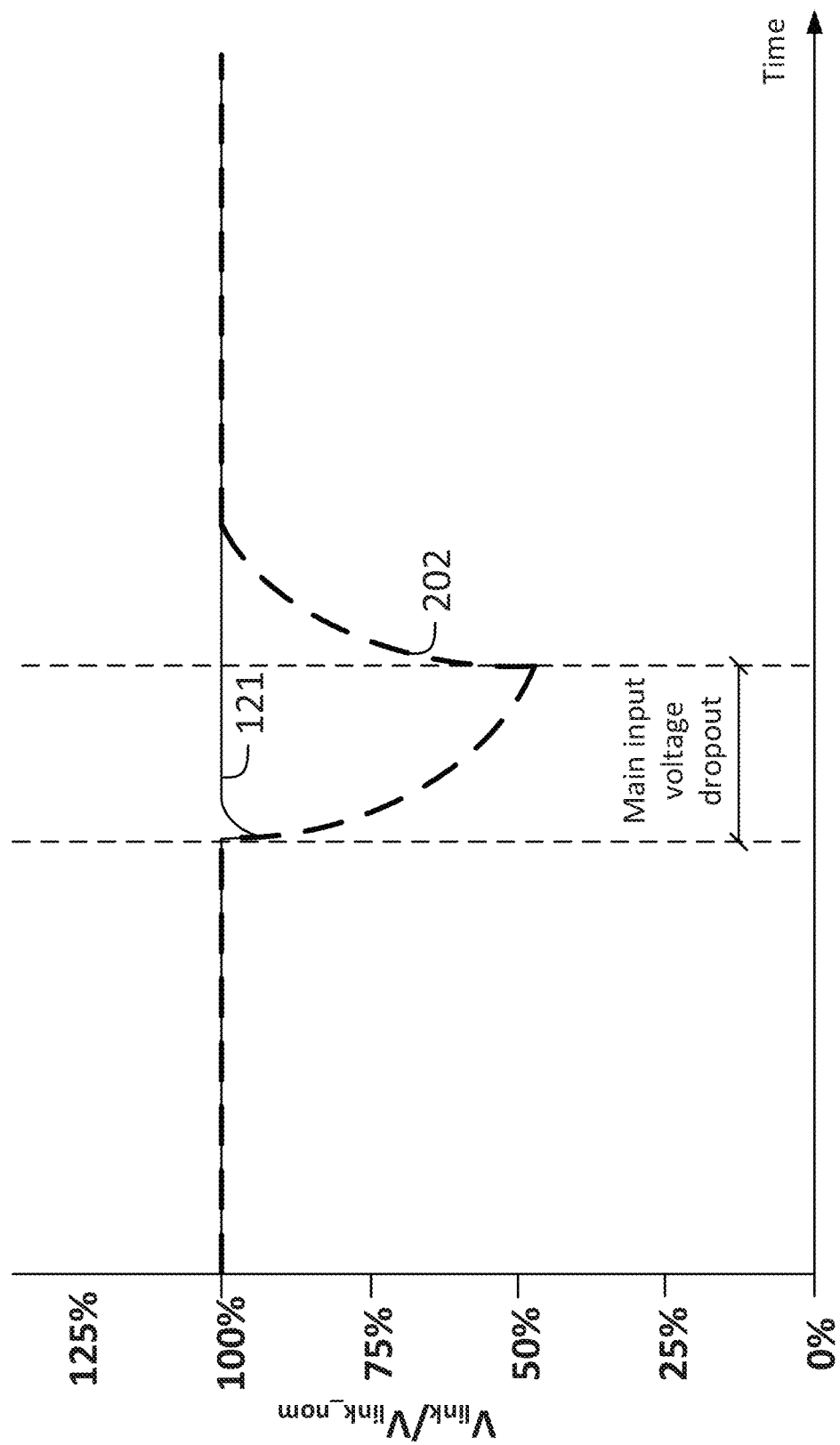
FIG. 2C is a graph illustrating a comparison plot of the DC link voltage of the single-source power system compared to that of a power system also having an interim source in accordance with one of a number of embodiments.
Figure 2D:
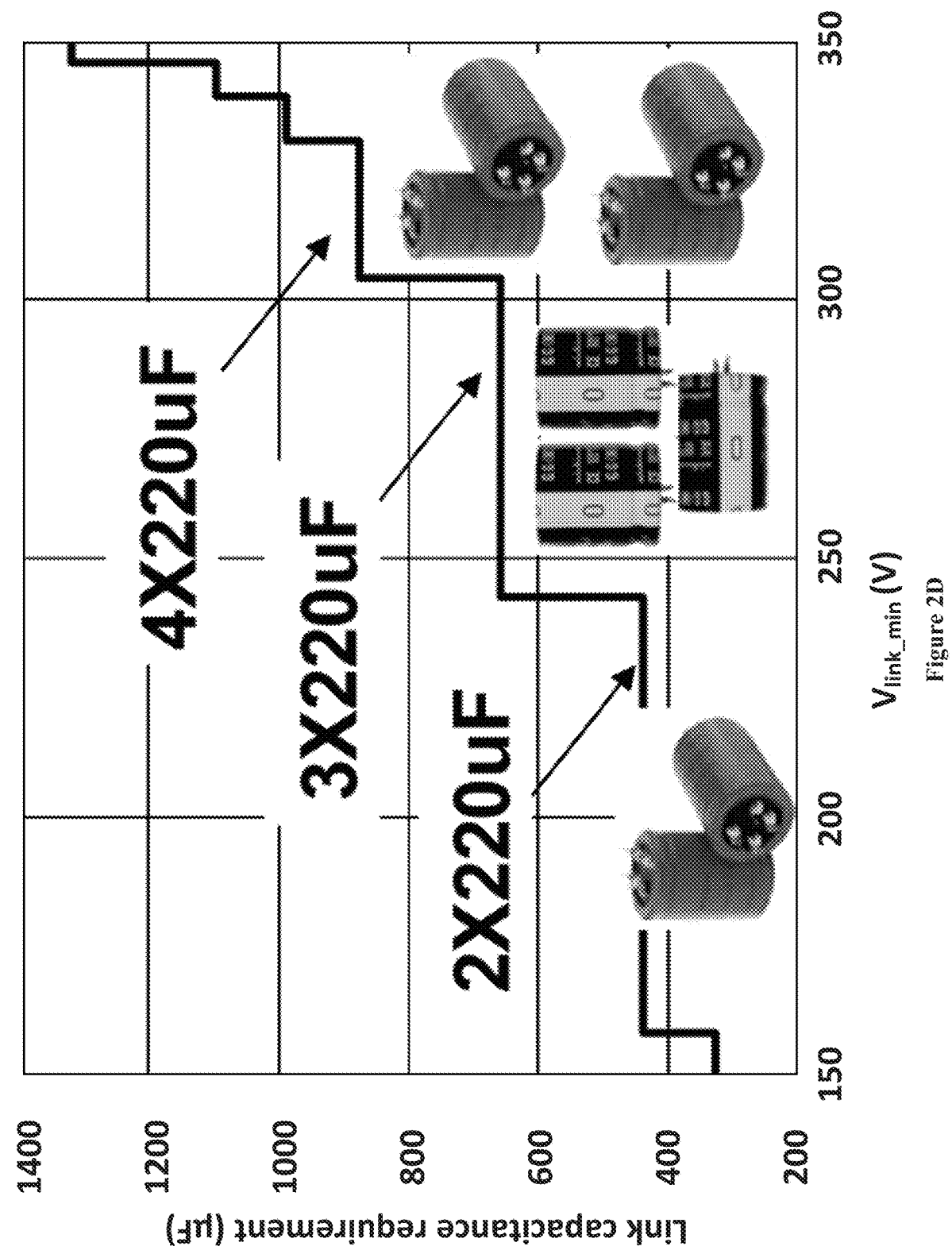
FIG. 2D is a graph illustrating exemplary minimum link capacitances plotted against minimum link voltages for the single-source power system of FIG. 2A.

Referring now to FIG. 2C, a comparison plot is made of the $V_{link}$ of power system 121 compared to that of the single-source power system 202 in response to a dropout of the main input voltage $V_{main}$. The $V_{link}$ of single-source power system 202 starts to decay when the dropout occurs and continues to decay until the dropout condition is over, and then it requires a period of high-current flow to charge link capacitor bank 611 to bring its $V_{link}$ back to nominal. Relative to the $V_{link}$ of the single-source power system 202, however, the $V_{link}$ of power system 121 decays for only a very short period. The Interim Source 140 prevents further decay of $V_{link}$ by supplementing load power, which is reflected back through SMPS stage 110 to bring the $V_{link}$ of power system 121 near to its nominal value. Thus, in some embodiments, the Interim Power Source 140 may reduce the minimum required hold-up time of power system 121 relative to power system 202. Furthermore, FIG. 2D plots exemplary minimum link capacitances against exemplary values of $V_{link\_min}$ for the single-source power system 202, but supplementing load power by the Interim Source 140 may reduce these minimum link capacitances for embodiments of power system 121.

Furthermore, in some embodiments of power system 121 that use an LLC converter or similar topology in the SMPS stage 110, reducing hold-up time may allow use of a transformer with a reduced airgap or without an airgap, which decreases energy losses and reduces the difficulty and expense of manufacturing the transformer. In some embodiments the required hold-up time of power system 121 is reduced by half relative to power system 202. In an example, given the same link capacitance and the same range of $V_{link\_nom}$ from 380 to 420V at full load power, if the time in which link capacitance 211 of power system 202 decays from $V_{link\_nom}$ to $V_{link\_min}$ were 20 milliseconds, then under the same conditions the minimum hold-up time for power system 121 would be not greater than 10 milliseconds.

Furthermore, FIG. 2C shows that the $V_{link}$ of power system 121 stays nearly constant. In some embodiments, power system 121 maintains $V_{link}$ relative to its nominal value within a range of 80% to 120%, inclusive. The reduced variation of $V_{link}$ of power system 121 in turn reduces the voltage regulation requirements of SMPS Stage 110.

In some embodiments having reduced variation of the link voltage $V_{link}$ of the SMPS stage 110, a PWM-controlled topology may be used in the SMPS stage 110 without sacrificing duty cycle for rarely occurring operation points. Such PWM-regulated topologies reserve a maximum duty cycle for operation at their lowest required input voltage and may include, for example, Single-Transistor Forward (STF), Two-Transistor Forward (TTF), Interleaved TTF (ITTF), phase shift ZVS, push-pull, active-clamp, hard switching half-bridge, and hard switching full bridge topologies.

Figure 2E:
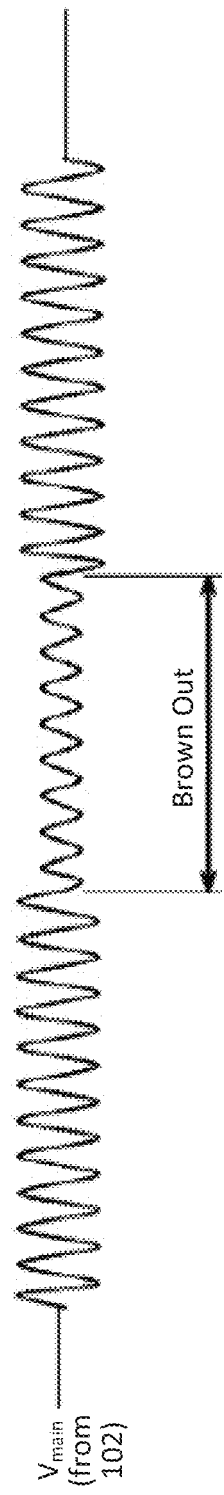
FIG. 2E is a signal diagram illustrating an exemplary brown out operating condition of an AC power source in accordance with one of a number of embodiments.

Additionally, for embodiments of power system 121 that receive an AC main input power (e.g., from the PDU 102 of FIG. 1B) and that include a PFC stage, reducing the amount of stored energy of the link capacitor bank 111 that is discharged during a dropout condition may prevent large restart currents from being switched by the PFC stage to recover the nominal $V_{link}$. Some embodiments may also reduce stress on the PFC stage by preventing increased current during and/or after a brown-out condition which is depicted in FIG. 2E, and which may last much longer than a dropout condition. In such embodiments, the Interim Source 140 may take over at least a portion of the load power during at least a portion of the brown-out time interval, where the duration of load power supported by the Interim Source 140 is dependent on the battery size, the severity of the brown-out, and the load power level.

Figure 2F:
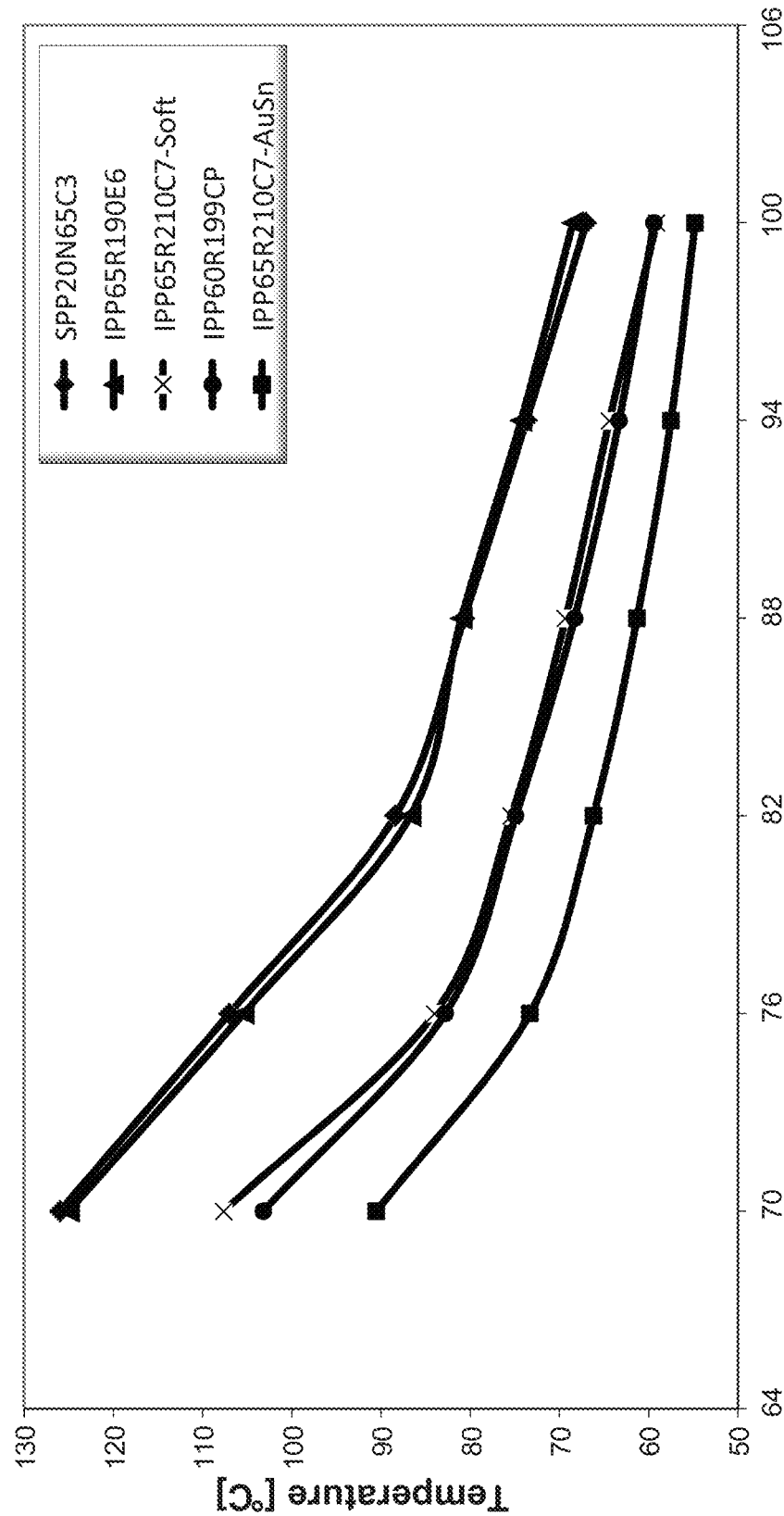
FIG. 2F is a graph illustrating exemplary increased PFC switching temperatures as the main input voltage drops for the single-source power system of FIG. 2A.

Furthermore, reducing PFC currents in some embodiments of the power system 121 during and/or after a dropout or brownout may reduce power losses and thermal stresses of the PFC stage relative to power system 202 and may allow the use of technologies, products, or packages that have higher $R_{DSon}$ values or that are less capable of thermal dissipation. For example, power system 202 may uses various exemplary switching Metal Oxide Semiconductor Field Effect Transistors (MOSFETs) in a PFC stage, and these various PFC MOSFETs experience increased temperatures as the main input voltage drops, as depicted in FIG. 2F. These increased temperatures in power system 202 require increased thermal dissipation. In an embodiment, power system 121 relaxes this thermal dissipation constraint relative to power system 202 and uses Surface Mount Device (SMD) packages instead of, e.g., TO247 packages. Use of such SMD packages may allow automated board mounting, decreased parasitic inductance, and the use of fast switching components in the PFC stage such as advanced super-junction devices and Gallium Nitride High Electron Mobility Transistors (GaN HEMTs).

Figure 3:
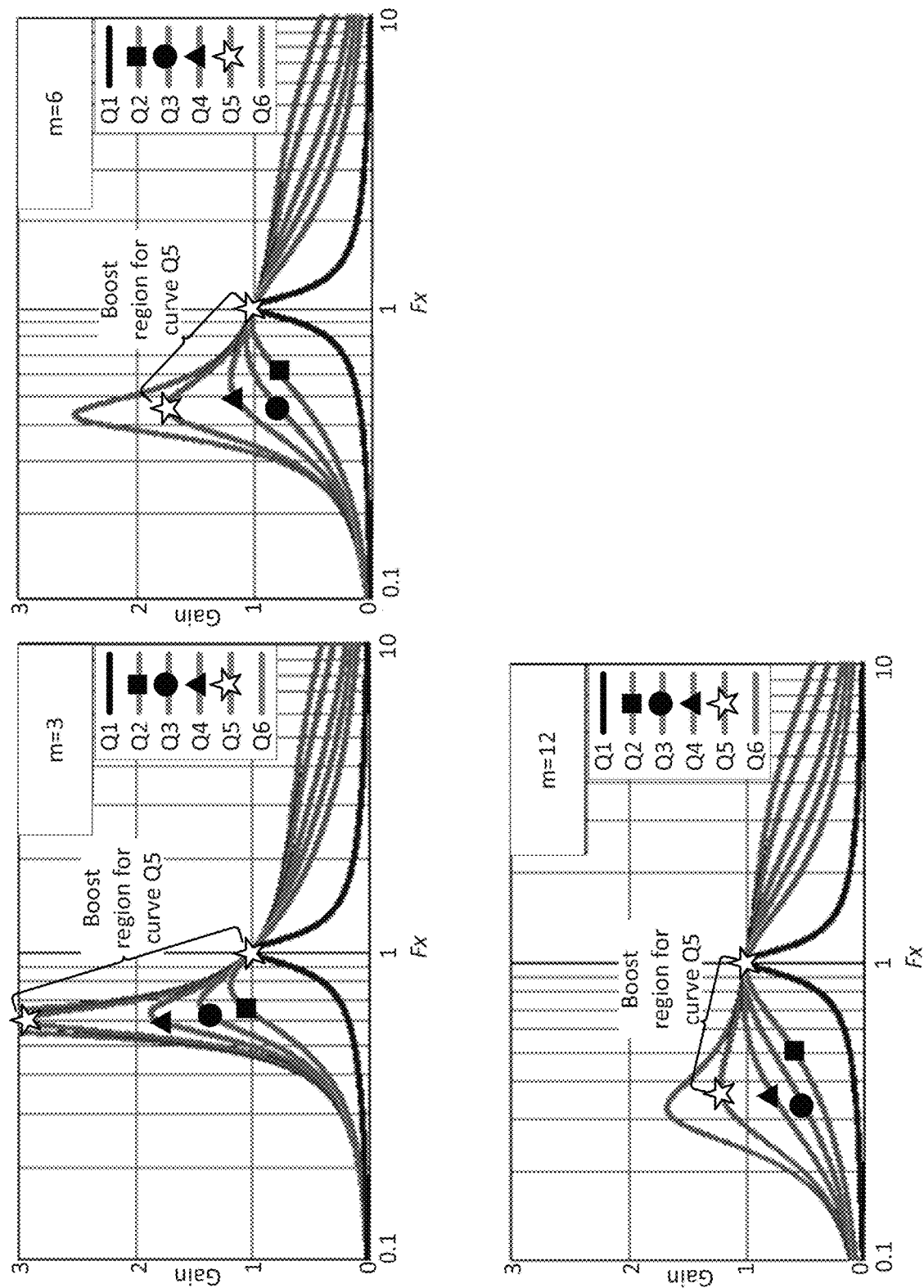
FIG. 3 includes graphs illustrating the benefit of reducing the required voltage regulation range of a resonant LLC DC/DC converter in accordance with one of a number of embodiments.

FIG. 3 helps illustrate the benefit of reducing the required voltage regulation range of embodiments of the SMPS stage 110 that are implemented as resonant LLC DC/DC converters. FIG. 3 plots the gain versus normalized switching frequency ($F_x$) curves of six different LLC converters at three different m values, where m is the ratio of total primary inductance (magnetizing inductance plus resonant inductance) versus resonant inductance. For a given LLC converter curve and m-ratio, such as, for example the curve Q5 on the m=3 plot of FIG. 3, a gain boost region has a minimum and a maximum switching frequency bound. The minimum bound is a switching frequency below which hard commutation events may occur, and the maximum bound occurs at the normalized switching frequency of $F_x$ equal to 1, i.e., at the resonant frequency. The gain provided by the LLC converter decreases with increasing $F_x$ in the boost region up to the resonant frequency. Since a voltage regulation range required for SMPS stage 110 of power system 121 is reduced relative to that of single-source power system 202, peak gain is less likely to be needed from the SMPS stage 110. Thus, in some LLC converter embodiments of SMPS stage 210, the LLC converter may be driven at near resonant frequency throughout a wider range of main input power and load power conditions, thereby achieving improved efficiency and reducing the likelihood of hard commutation events.

Furthermore, for a given LLC converter curve (e.g., curve Q5), the peak gain provided by the boost region decreases with increasing m-ratio. The reduced requirement for peak gain of LLC converter embodiments of SMPS stage 110 allows them to be implemented with an increased m-ratio. For example, an m-ratio equal to 10 or greater may be used in some LLC converter embodiments of SMPS stage 110. In high-m embodiments, the converter's magnetizing inductance may be increased, resulting in lower magnetizing current, as well as lower conduction losses in the transformer core and in the printed circuit board and switches of the power system 121. To reduce any increase in delay time due to decreased magnetizing current, in some embodiments of SMPS 110 an LLC converter may use transistors with a small figure of merit $R_{DSon} \times Q_{oss}$, where $Q_{oss}$ is the transistor's output capacitance charge. For example, GaN HEMTs may be used which have a $R_{DSon} \times Q_{oss}$ figure of merit up to ten times lower than silicon-based super-junction devices with the same $R_{DSon}$ and voltage rating.

Figure 4:
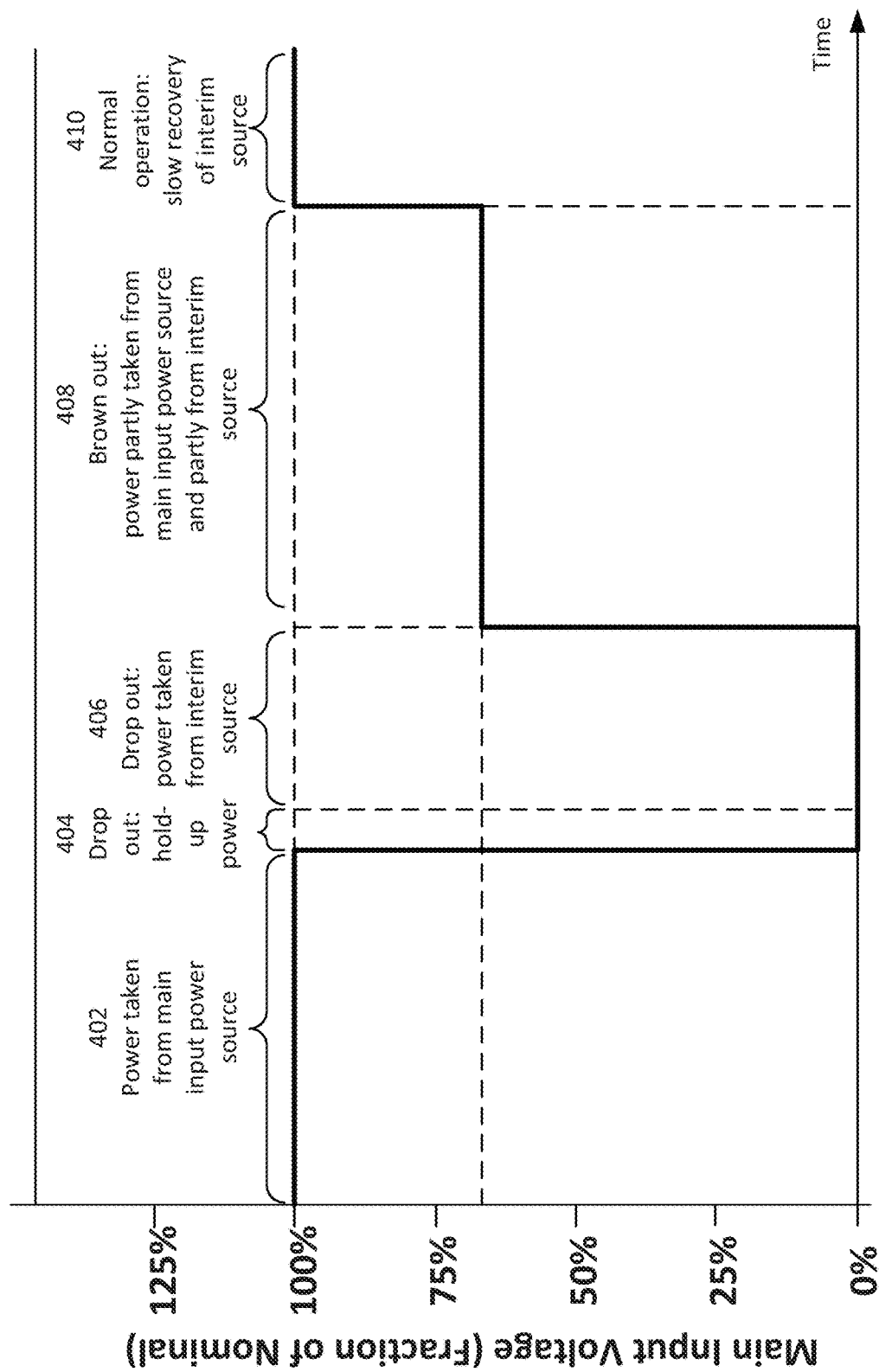
FIG. 4 is a graph illustrating various main input power conditions in accordance with one of a number of embodiments.

FIG. 4 plots the main input voltage $V_{main}$ of power system 121 as a fraction of its nominal value against time periods during which various operating conditions of the main input power source 103 may occur. Such operating conditions include a normal operating condition, a brown-out operating condition, and a dropout operating condition. The main input power source 103 has a normal operating condition when $V_{main}$ is between 80% and 120% of its nominal value, inclusive. For example, when the nominal voltage of $V_{main}$ is 225V, a normal operating condition is present when $V_{main}$ is between 180V to 270V, inclusive. The main input power source 103 has a brown-out operating condition when $V_{main}$ is not less than 40% but less than 80% of its nominal value. For example, when the nominal voltage of $V_{main}$ is 225V, a brown-out operating condition is present when $V_{main}$ is not less than 90V but less than 180V. The main input power source 103 has a dropout operating condition when $V_{main}$ is less than 40% of its nominal value. For example, when the nominal voltage of $V_{main}$ is 225V, a dropout operating condition is present when $V_{main}$ is less than 90V.

Referring again to FIG. 4, during period 402, main input power source 103 has a normal operating condition and a mode of operation is activated for power system 121 such that power to the load 138 is taken from main input power source 103. During period 404, a dropout of the main input voltage occurs and hold-up power is provided to the load 138 by DC link capacitor bank 111 via the SMPS stage 110. As the dropout condition continues during the next period 406, load power is taken from the Interim Source 140. During period 408, a brown-out condition of the main input voltage occurs, and load power is partly taken from main input power source 103 and partly taken from Interim Source 140. During period 410, normal operation of the main input power source 103 resumes, power to the load 138 is taken from main input power source 103, and the Interim Source 140 slowly recovers its stored energy. In embodiments that charge the battery from the output of the SMPS stage 110, because the time interval for recharging the Interim Source 140 is longer than the time interval for recharging the DC link capacitor bank 111, burst mode frequencies that are outside the audible range may be used in the SMPS stage 110.

Figure 5:
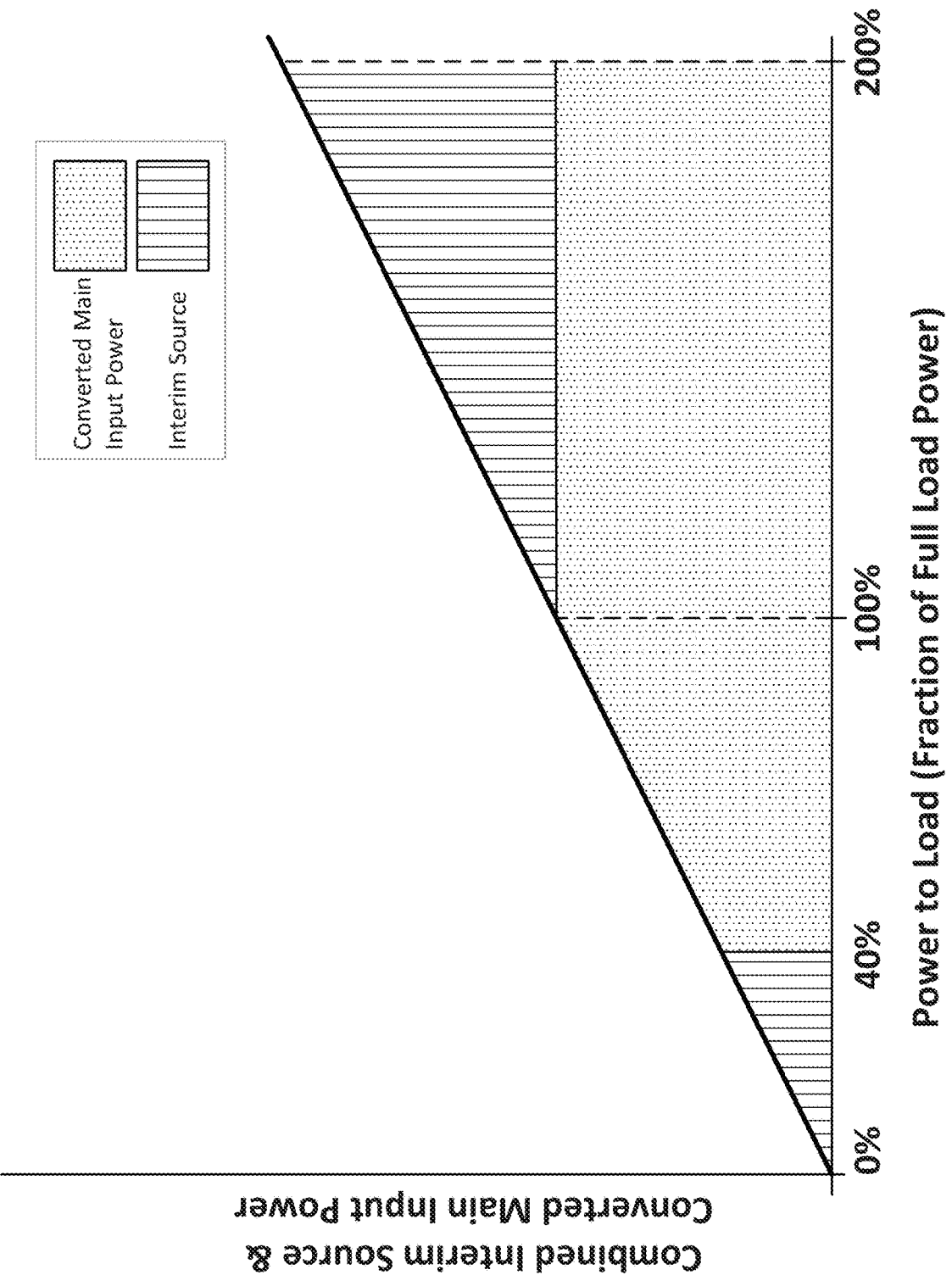
FIG. 5 is a graph illustrating the fraction of load power coming from different sources for a power system having an interim source in accordance with one of a number of embodiments.

FIG. 5 is a graph showing the source of load power for an embodiment of the power configuration 100 of FIG. 1A. FIG. 5 plots a combined power of the main input power that is converted through the power system 121 and the interim source power, against the fraction of a specified full load power that is demanded by the load. The plot of FIG. 5 is for an embodiment that has a linear relationship between these variables that are plotted against each other. In other embodiments, these variables may be related by a non-linear relationship.

The amount of power provided by the main input power source 103 is capped at 100% of full load power, which may be specified, for example, as an expected average load power, combined with some moderate safety margin. Thus, when the load power fraction is greater than 100% of full load power, only the portion of load power equal to full load power is provided by the main input power source 103, and the remainder of load power is provided by the Interim Source 140. In an embodiment, the Interim Source 140 is capable of providing load power support during the entire expected interval of peak load power, which allows hardware costs to be reduced since the SMPS 110 is only required to be dimensioned to full load power rather than peak load power conditions. For example, for a peak load power level of 800 Watts (W) for the overall power system, using the Interim Source 140 to cap a maximum output requirement of the SMPS 110 to a full load power of 400 W may allow the power system 121 to include two redundantly connected PSUs that are each implemented as, e.g., PSU 106B of FIG. 1D, each with only 400 W maximum power output. Such redundantly connected 400 W PSUs may decrease hardware costs while maintaining the same load power uptime relative to providing two 800 W power supplies.

At no load power or very light load power conditions, main input power is not converted to the DC output of power system 121, so that power is taken from Interim Source 140 alone. For example, in the embodiment of FIG. 5, when the load power fraction is less than 40% of full load power, the power system 121 does not use any main input power but instead the load power is provided only by the Interim Source 140. The conversion of main input power to the output of Power System 121 may be interrupted by, for example, turning off the SMPS stage 110, or in embodiments of power system 121 that feed the SMPS stage 110 from a PFC stage, by turning off the PFC stage.

Referring again to FIG. 5, when the load power fraction is in the range of 40% to 100% of full load power, the power to the load is provided only by the main input power source 103. At the low end of this range (e.g., 40% of full load power), the SMPS stage 110 may be operated efficiently in burst mode for relatively long time intervals of, e.g., hundreds of milliseconds to even seconds. In some embodiments, limiting the range of load power provided by the main input power source to between 40% and 100% of full load power reduces dynamic load stress on secondary-side synchronous rectification elements of the SMPS stage 110, so that these synchronous rectification elements may be designed for voltages in accordance with commonly occurring operating conditions.

In some embodiments that include LLC converters or similar topologies for the SMPS stage 110, providing power only from the Interim Source 140 for load power levels that are less than 40% of full load power may prevent various low-load inefficiencies of SMPS components that would otherwise occur. In such embodiments, providing low load power levels only from Interim Source 140 may be done, for example, instead of implementing a capacitor in parallel with the converter's primary-side switches, such an implementation avoids decreased reliability due to high voltage across the capacitor, limited maximum switching frequency, increased device costs, and increased space requirements. As another example, providing low load power levels only from Interim Source 140 may also prevent the parasitic capacitance of the converter's synchronous rectification switches from reducing efficiency. As a further example, providing low load power levels only from Interim Source 140 may prevent hard commutation of the converter's body diodes such as might otherwise occur, e.g., during burst mode operation when the converter is not fully charged or its half-bridge is turned on at a conflicting point in time.

In some embodiments where the SMPS stage 110 includes an LLC converter or similar topology, providing low load power levels only from Interim Source 140 may also allow reducing the use of burst mode and may thereby reduce load power ripple current, acoustic noise, control complexity, and reliability risk (especially of the converter's primary-side switches). In some embodiments where the LLC converter or similar topology has a primary-side switching node that includes fast, efficient switches with high dV/dt such as, e.g., super-junction switches and other switches with low $R_{DSon} \times A$ values, providing low load power levels only from Interim Source 140 may also prevent reduced efficiency caused by transformer coupling capacitance.

Figure 6A:
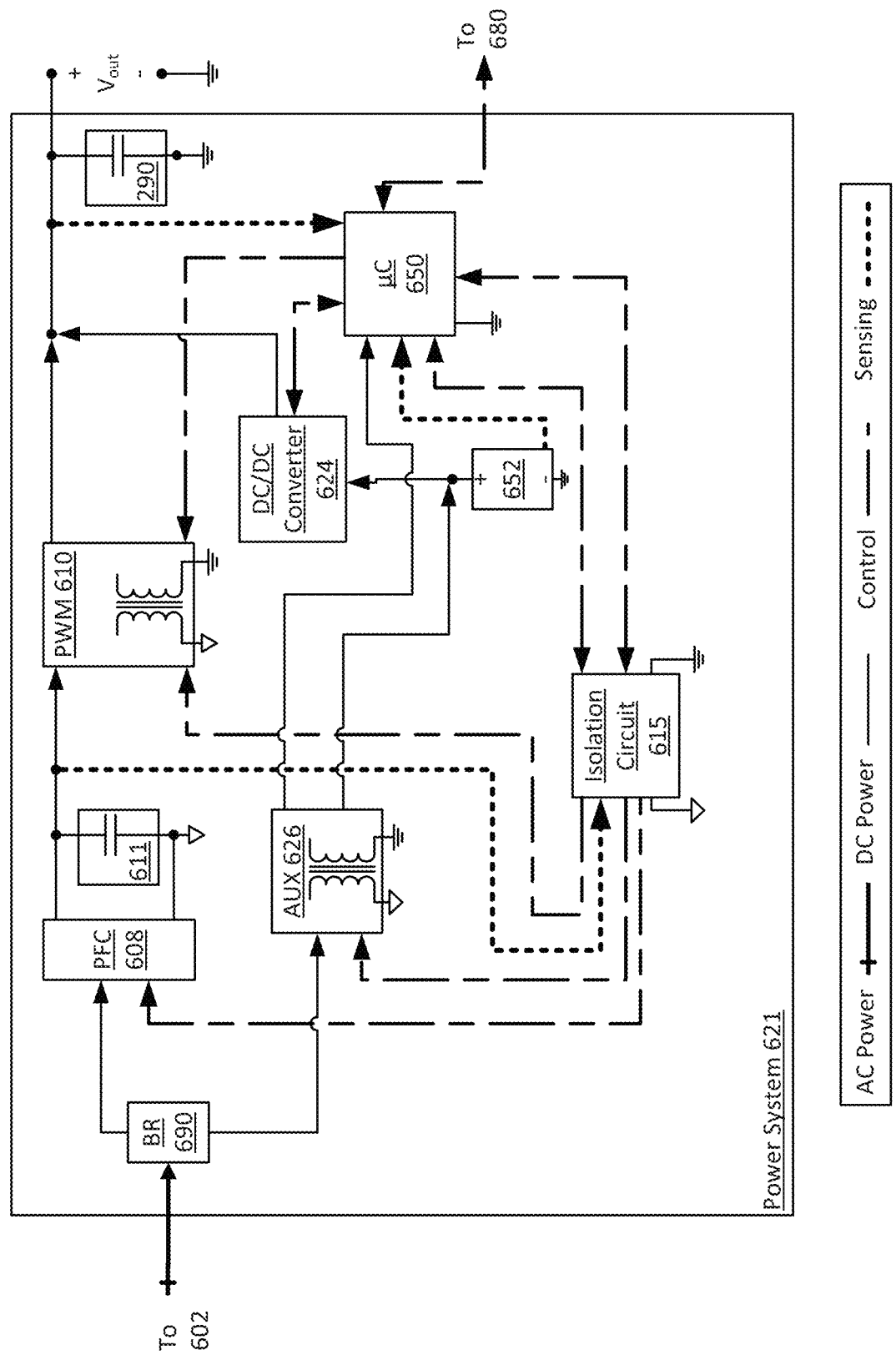
FIG. 6A is a block diagram illustrating a power system that includes a single microcontroller in accordance with one of a number of embodiments.

FIG. 6A provides an embodiment power system 621 of the power system 121 of FIG. 1A that includes a single microcontroller 650. The power system 621 implements the SMPS stage 110 as a PWM stage 610, and the power system 621 includes an Auxiliary (AUX) DC-to-DC converter 626 and Isolation Circuit 615. The Isolation Circuit 615 may include multiple sub-circuits such as, for example, multiple optocouplers, to provide isolation between multiple inputs and outputs of the Isolation Circuit 215. The power system also includes a Bridge Rectifier (BR) 690 and a PFC stage 608. The PFC stage 608 includes a switching circuit that may be implemented, for example, as a MOSFET. The Interim Source 140 is implemented as one or more batteries 652 connected by a bidirectional DC/DC converter 624, such as, for example, a buck-boost converter.

PWM stage 610 of FIG. 6A provides at least a portion of a DC output power of power system 621 during an AC input power dropout or brownout. During such abnormal power conditions, DC power is also output from the batteries 652 via the DC/DC converter 624 to provide at least a portion of the DC output power to the load 638 from the power system 621. A sensing input of the microcontroller 650 is also connected to sense the DC output of the power system 621 to detect, for example, a low $V_{out}$ condition.

A control output of microcontroller 650 is provided to the primary side of PWM stage 610 via the Isolation Circuit 615 to control primary-side switching of the PWM stage 610, including controlling a primary-side switching rate. Another control output of the microcontroller 650 is provided directly to the secondary side of the PWM Stage 610 and is used to control secondary-side PWM switching such as, for example, synchronous rectification switching. Bidirectional control is provided between inputs and outputs of microcontroller 650 and those of DC/DC converter 624 to close a switching feedback control loop of the DC/DC converter 624. A sensing output from the batteries 652 is also provided to microcontroller 650 to indicate a battery voltage level.

Communication, control, and sensing may also occur between microcontroller 650 and other components of the power system 621 by way of Isolation Circuit 615. Switching signals of AUX converter 626 are provided by a control output of Isolation Circuit 615. A control output of Isolation Circuit 615 is also provided to PFC stage 608 so that, for example, the microcontroller 650 may coordinate switching of the PWM stage 610 and the PFC stage 608, and may turn off PFC stage 608 under certain operating conditions. A sensing output from the DC input to the PWM stage 610 is provided to Isolation Circuit 615.

Single-phase AC power that is input to the power system 621 is provided to BR 690. DC power is output from BR 690 to PFC stage 608. DC power is output from PFC stage 608 to PWM Stage 610 across a DC link that includes a link capacitor bank 611 coupled in parallel with the PWM Stage 610.

DC power is also output, under at least some operating conditions, from BR 690 to AUX converter 626 and from AUX converter 626 to power the power supplies of various components such as microcontroller 650 in order to charge batteries 652, and to pre-charge the power system DC output capacitor bank 290 via DC/DC converter 624. In some embodiments, AUX converter 626 has a wide range of voltage regulation relative to DC/DC converter 624 and PWM Stage 610.

Figure 6B:
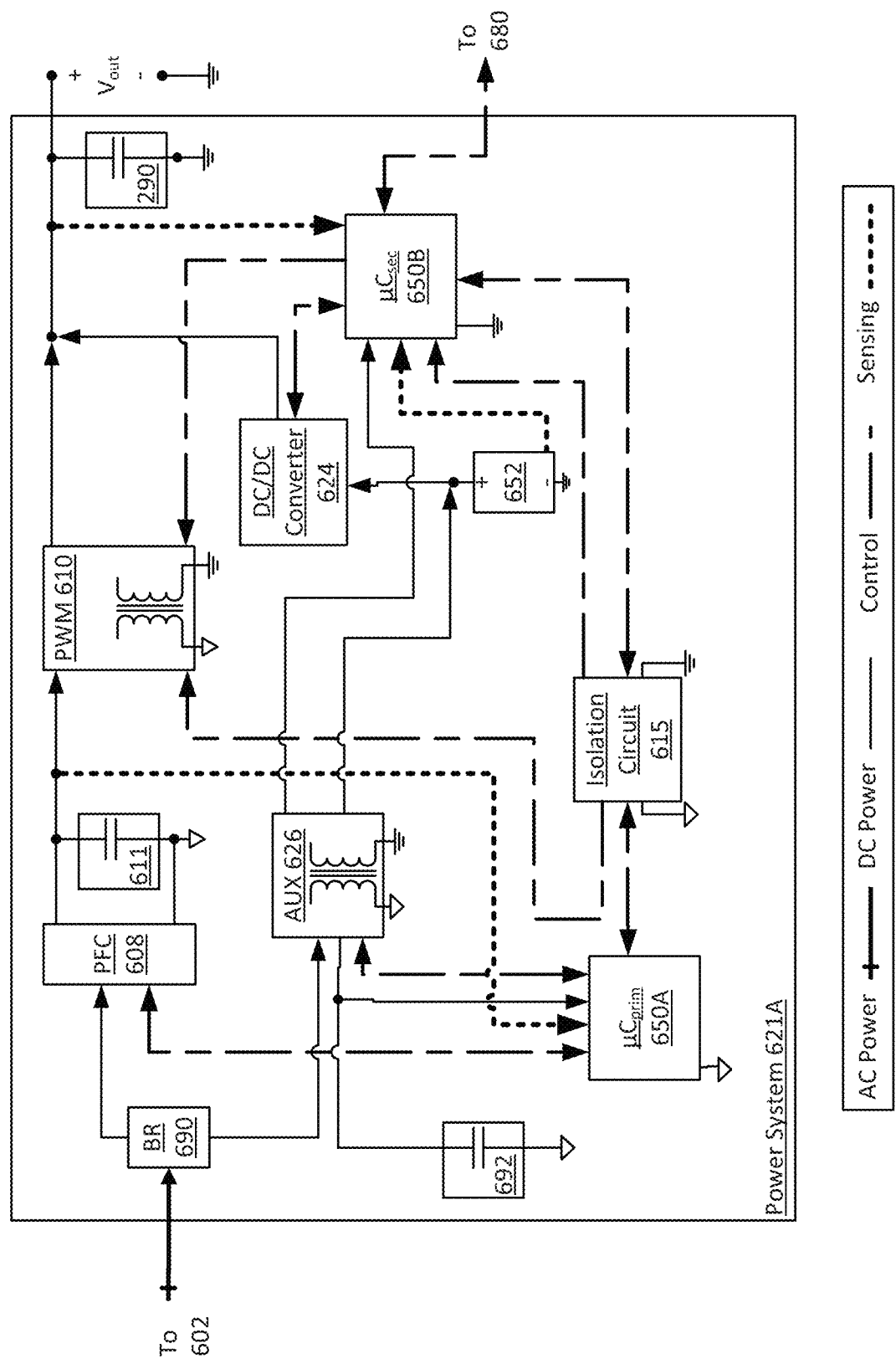
FIG. 6B is a block diagram illustrating a power system that includes both a primary-side microcontroller and a secondary-side microcontroller in accordance with one of a number of embodiments.

FIG. 6B shows an embodiment power system 621A, which includes minor modifications of the power system 621. In power system 621A, the functions of the microcontroller 650 have been divided into two microcontrollers, a Primary-side Micro-Controller ($\mu C_{prim}$) 650A and a Secondary-side Micro-Controller ($\mu C_{sec}$) 650B. These two microcontrollers provide coordinated control of the power system 621 to achieve desired system objectives such as, for example, minimizing required hold-up time or reducing switching losses. The primary-side microcontroller 650A and secondary-side microcontroller 650B coordinate by bi-directional communication and control signaling through the Isolation Circuit 615. The use of primary-side microcontroller 650A allows, in some embodiments, to relax microcontroller performance requirements of secondary-side microcontroller 650B relative to that of microcontroller 650 of FIG. 6A. The primary-side microcontroller 650A provides many of the control signals that were provided, via the Isolation Circuit 615, by the microcontroller 650 of FIG. 6A. The secondary-side microcontroller 650B sends and receives the remaining control, communication, and sensing signals that were sent and received by microcontroller 650 in the embodiment of FIG. 6A.

Referring again to the embodiment of FIG. 6B, power to primary-side microcontroller 650A is provided by AUX converter 626. AUX converter 626 and primary-side microcontroller 650A are coupled to auxiliary input capacitor bank 692, which may be charged from the primary windings of AUX converter 626.

AUX converter 626 receives switching control signals and sends power condition information by way of a bi-directional communication and control signal path between AUX converter 626 and primary-side microcontroller 650A. The primary-side microcontroller 650A uses a bi-directional communication and control path with PFC stage 608 to receive current readings and rectified voltage readings and to send switching control signals so that, for example, switching of the PFC stage 608 may be coordinated with switching of the PWM Stage 620, and so that PFC stage 608 may be turned off under certain operating conditions. The sensing output from the DC output of PFC stage 608 is also provided to primary-side microcontroller 650A.

Figure 6C:
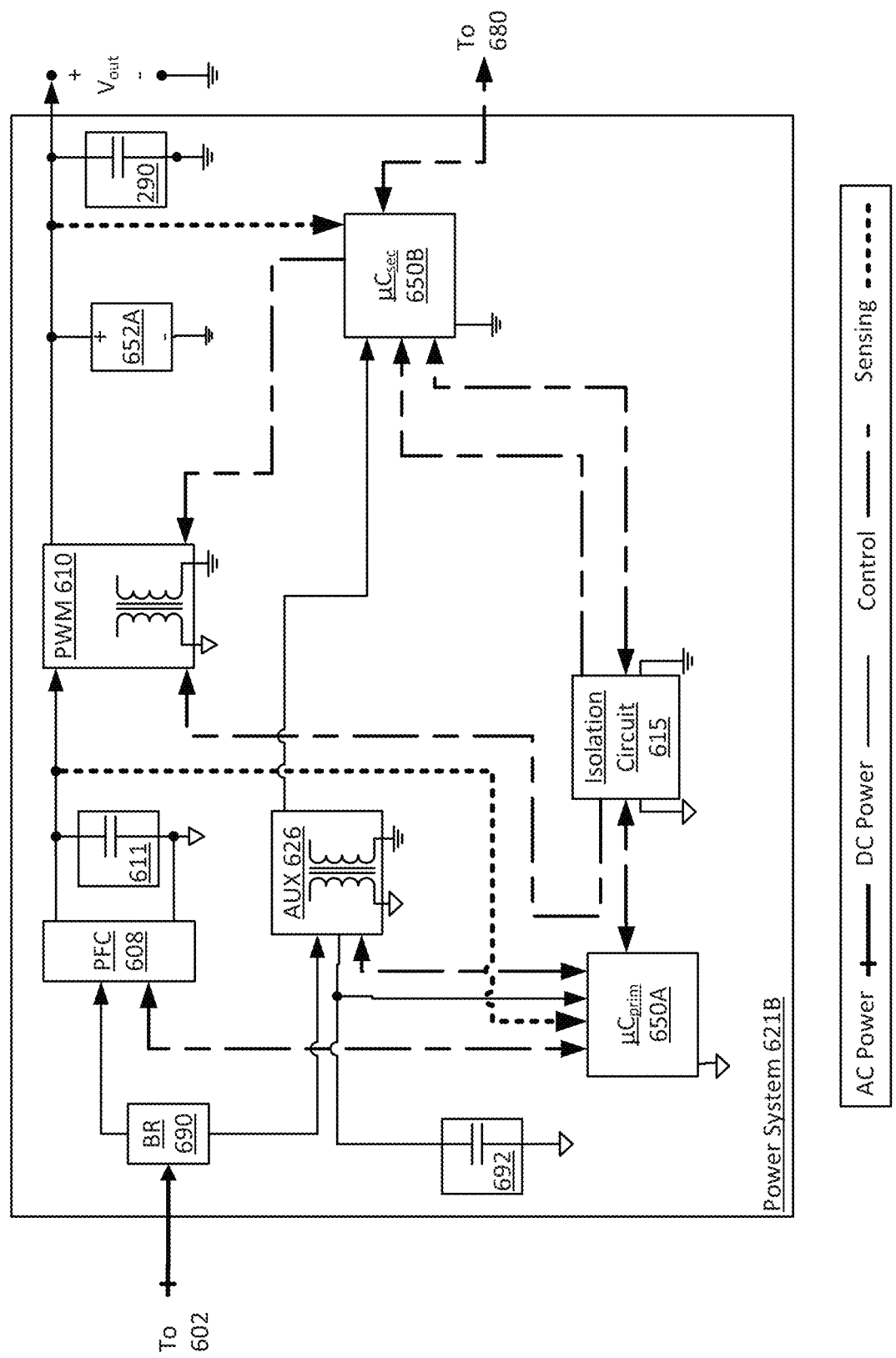
FIG. 6C is a block diagram illustrating a power system that includes a battery directly coupled to the output of a PWM stage in accordance with one of a number of embodiments.

FIG. 6C shows an embodiment power system 621B, which includes minor modifications of the power system 621A of FIG. 6B. Relative to batteries 652 of power system 621A, batteries 652A of power system 621B have a higher voltage so that they may be connected to the DC power output of the power system 621B without requiring any voltage conversion. Therefore DC/DC converter 624 is no longer needed in power system 621B. Under some conditions, the batteries 652A directly supplement the DC output power provided to the load 638. The batteries 652A may thus be included in some embodiments as an internal component of a PSU of the power system 621B. Since the batteries 652A are connected directly to the output of the PWM Stage 620, they are charged directly from the output of the PWM Stage 620 instead of from the AUX converter 626 that was used to charge the batteries 652 in power system 621A of FIG. 6B.

Figure 6D:
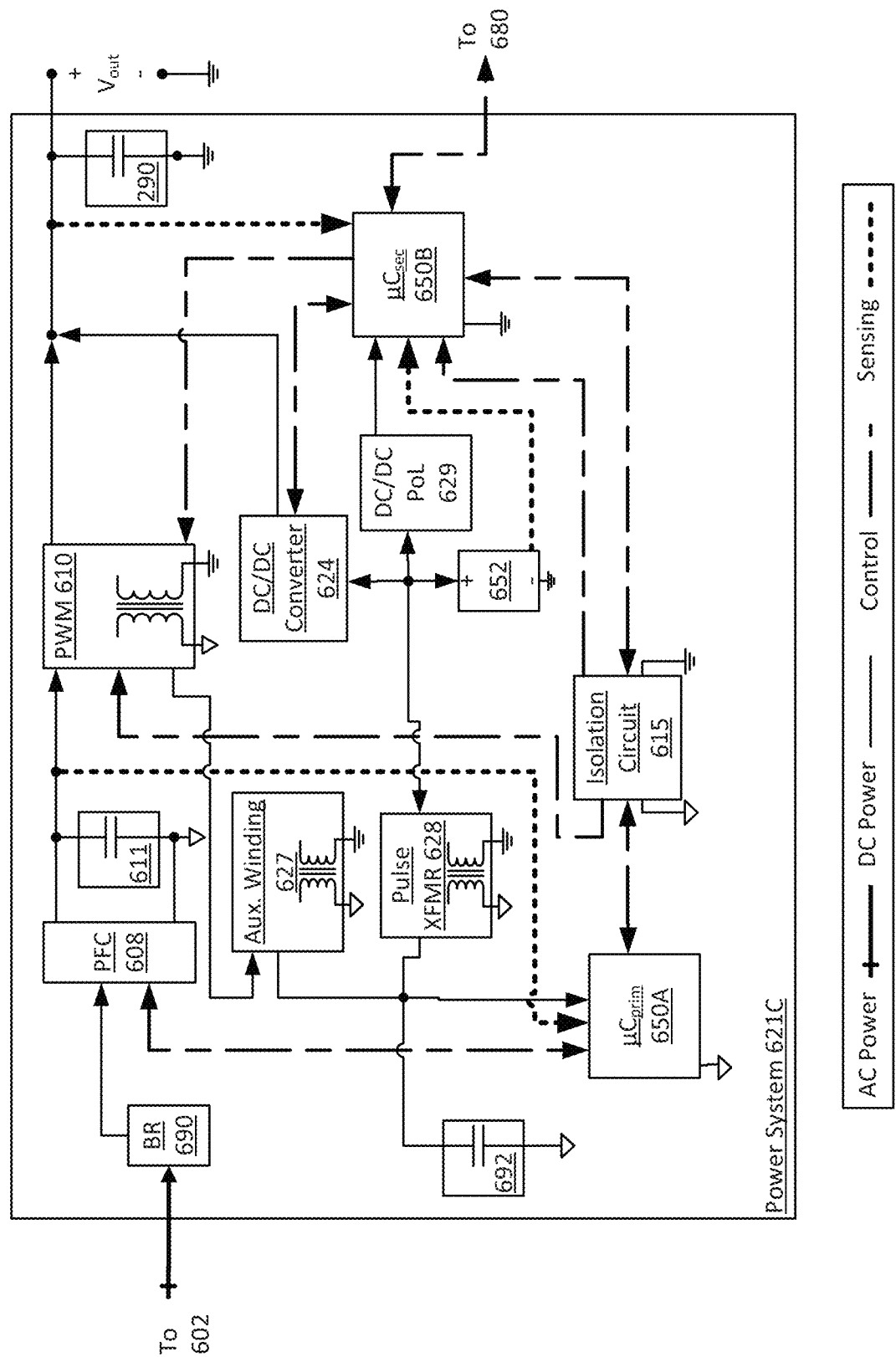
FIG. 6D is a block diagram illustrating a power system that replaces an auxiliary converter with a pulse transformer and an auxiliary transformer winding in accordance with one of a number of embodiments.

FIG. 6D shows an embodiment power system 621C, which includes minor modifications of the power system 621A of FIG. 6B. In power system 621C, the power needed by the secondary-side microcontroller 650B and collateral logic circuitry is not provided by AUX converter 626, but instead is provided from the batteries 652 through a DC/DC Point-of-Load (PoL) converter 629.

AUX converter 626 of FIG. 6B has been replaced by a Pulse Transformer (XFMR) 628 and an Auxiliary Winding 627 of a transformer of the PWM stage 610. The batteries 652 are charged from the DC/DC Converter 624. The Pulse Transformer 628 and Auxiliary Winding 627 are both coupled to the primary-side microcontroller 650A and to the auxiliary input capacitor bank 692. During a start-up sequence, power can be transferred from the batteries 652 to the primary-side microcontroller 650A through Pulse Transformer 628. Once the start-up sequence has completed, power needed at the primary-side microcontroller 650A can be derived from Auxiliary Winding 627, and the Pulse Transformer 628 becomes inactive.

In some embodiments, the replacement of AUX converter 626 of FIG. 6B by Winding 627 and Pulse Transformer 628 of FIG. 6D increases efficiency and decreases cost but also decreases power available for power system primary-side components. The total cost of Winding 627 and Pulse Transformer 628 may be less than that of AUX converter 626 (which is controlled by microcontroller 650A and which includes dedicated driver, switch and transformer circuits). Furthermore, in some embodiments the total efficiency of Winding 627 and Pulse Transformer 628 may be greater than that of a flyback-topology implementation of AUX converter 626, which may show limited efficiency in the range of 70% to 80%. Additionally, if control is more centralized in the secondary-side microcontroller 650B than in the primary-side microcontroller 650A, then less power may be needed by the primary-side microcontroller 650A and by any associated logic circuitry.

Figure 6E:
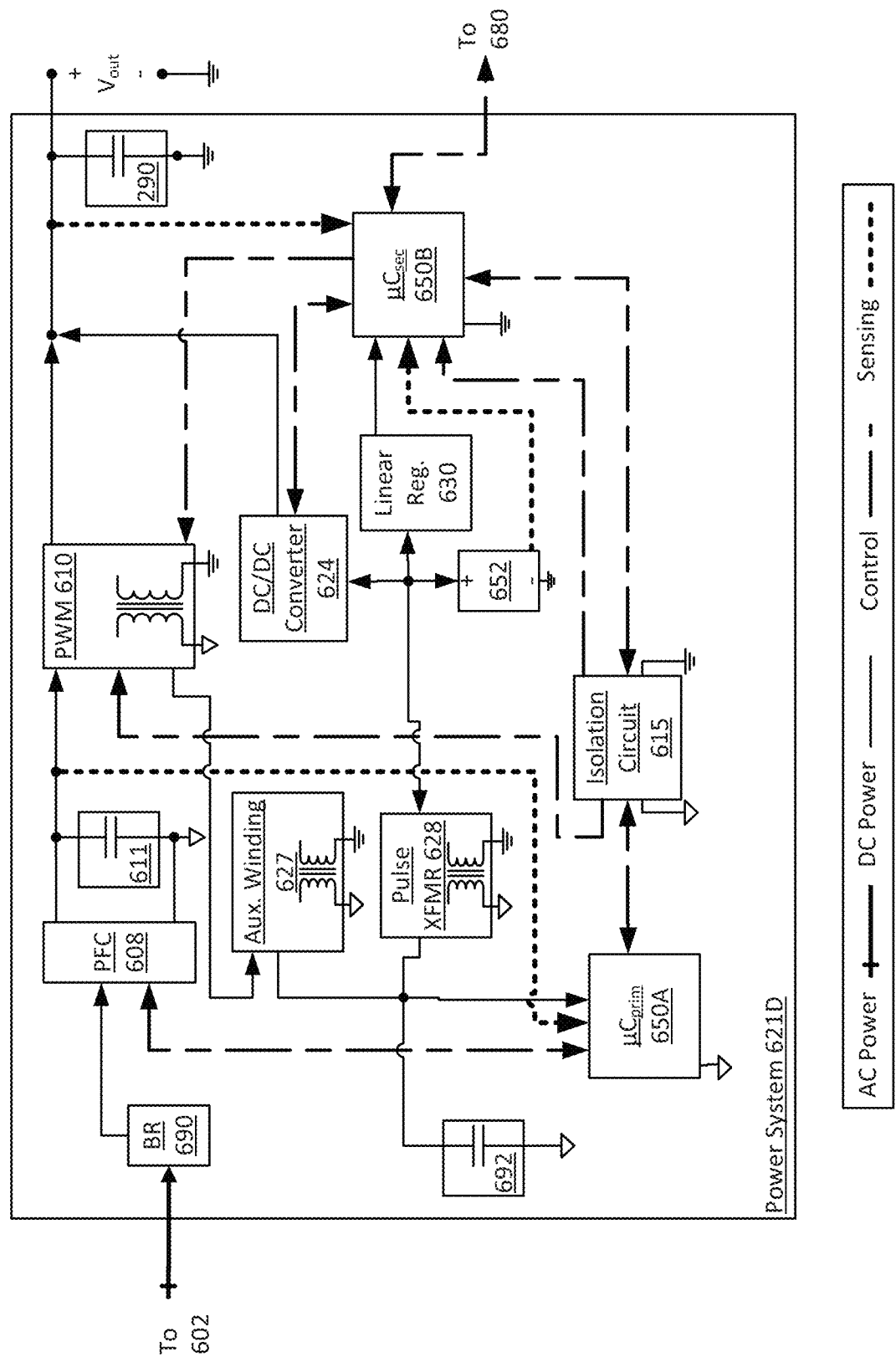
FIG. 6E is a block diagram illustrating a power system that replaces a DC/DC Point-of-Load (PoL) converter with a linear regulator in accordance with one of a number of embodiments.

FIG. 6E shows an alternative embodiment power system 621D. power system 621D is identical to the embodiment power system 621C of FIG. 6D, except that the DC/DC PoL converter 629 has been replaced by Linear Regulator 630.

Illustrative embodiments of the present invention have the advantage of providing control of decentralized batteries in a server system to improve server uptime and availability while at the same time, relative to the inclusion of a centralized Uninterruptible Power Supply (UPS) and any associated infrastructure, improving server architecture scalability and power flow efficiency to reduce cost of electricity and total cost of ownership. In some embodiments, such decentralized batteries may yield an increased power flow efficiency of 3 to 5%. Further advantages of decentralized battery embodiments include supporting survival functions of individual servers in enterprise server architectures where only one server may be capable of doing each specific task (e.g., running Systems-Applications-Products (SAP) data).

Further advantages of embodiments of the present invention include supporting load power from an interruption-resistant power source during a main input PLD to allow, for example, reduced hold-up time requirements, reduced current flow during system restoration, and reduced voltage regulation requirements of an SMPS stage. Reducing hold-up time requirements may allow, in some embodiments, reducing the capacitance and associated space and dollar expense of a DC link capacitance bank, and reducing or removing an LLC converter airgap to reduce energy losses and manufacturing expense. Reducing current during system restoration provides advantages such as, for example, reducing power losses and thermal stresses of a PFC stage and allowing the use of a wider variety of PFC technologies, such as less thermally dissipative SMD technologies.

Reducing the link voltage variation of the SMPS stage may allow, in some embodiments, the use of efficient PWM-based SMPS topologies without sacrificing duty cycle for rarely occurring operation points. In some embodiments that use an LLC converter or similar SMPS topology, advantages of reduced voltage regulation requirements may include allowing magnetizing inductance to be significantly increased, and allowing the SMPS stage to be switched at a near-resonant frequency throughout a wide range of power conditions to increase efficiency and reduce the likelihood of hard commutation events. Increasing magnetizing inductance of an LLC converter provides advantages of, for example, reducing magnetizing current and reducing conduction losses associated with the energy stored in the LLC resonant tank. In some LLC embodiments, less stringent timing requirements for system restoration may allow the use of burst mode frequencies outside the audible range. Additional advantages of embodiments of the present invention include pre-charging a power system output from an interim source to prevent over-resonant startup switching of an LLC converter and to allow its components to be chosen in accordance with frequently occurring operating conditions.

Further advantages of illustrative embodiments of the present invention include using an interim source to limit the range of load power required from a main power stage, including supplementing peak load power to reduce hardware costs of the main power stage, and supporting light load or no-load power operation to provide increased efficiency of an SMPS stage. In some embodiments, limiting the range of load power provided by the main power stage may also reduce dynamic load stress on switching elements of the SMPS.

The following additional example embodiments of the present invention are also provided. In accordance with a first example embodiment of the present invention, a method for power control is provided. The method includes determining a load power of a load coupled to an output of an isolated AC/DC power supply, and when the determined load power is less than a first threshold load power, providing the load power to the load from an interim power source.

Also the foregoing first example embodiment may be implemented to include one or more of the following additional features. The method may also be implemented such that the isolated AC/DC power supply is a uni-directional power supply configured to transfer power from an input of the isolated AC/DC power supply to the load.

The method may also be implemented to further include, when the determined load power is greater than a second threshold load power, providing the load power to the load at the same time from both the power supply and the interim power source. The method may also be implemented such that the first threshold load power is 40% of the second threshold load power.

The method may also be implemented to further include determining an input voltage of the power supply. In such an implementation, when the determined input voltage of the power supply is less than a first threshold voltage and is not less than a second threshold voltage, the method may also include providing the load power to the load at the same time from both the power supply and the interim power source.

The method may also be implemented to further include, when the determined input voltage is less than a second threshold voltage, turning off the power supply. In such an implementation, when the determined input voltage is not less than the first threshold voltage and is not greater than a third threshold voltage and the determined load power is not less than the second threshold load power and is not greater than the first threshold load power, the method may also include providing the load power to the load from the power supply. The method may also be implemented such that the first threshold voltage is 80% of a predetermined nominal input voltage, the second threshold voltage is 40% of the predetermined nominal input voltage, and the third threshold voltage is 120% of the predetermined nominal input voltage.

The method may also be implemented to further include, when the determined input voltage is less than the first threshold voltage, providing sufficient load power from the interim power source such that a link voltage of a link capacitor is maintained for at least 10 milliseconds at not less than 80% of a predetermined nominal link voltage and at not greater than 120% of the predetermined nominal link voltage. In such an implementation, the link capacitor may be coupled to a first stage of the power supply coupled to the input voltage, and the link capacitor may also be coupled to a switched-mode stage of the power supply coupled to the load.

The method may also be implemented such that turning off the power supply includes turning off a power factor correction stage of the power supply. The method may also be implemented to further include charging an output capacitor bank coupled across the load to a predetermined nominal DC output voltage during a start-up sequence. In such an implementation, providing the load power to the load from the interim power source may include providing the load power from a battery to a computer server including a processor. The method may also be implemented such that the power supply and the battery are disposed in the same mechanical housing.

In accordance with a second example embodiment of the present invention, a method for controlling a power supply is provided. The method includes determining an input voltage of the power supply. The method also includes, when the determined input voltage of the power supply is less than a first threshold voltage and is not less than a second threshold voltage, providing load power to a load at the same time from both the power supply and an interim power source.

Also the foregoing second example embodiment may be implemented to include one or more of the following additional features. The method may also be implemented to further include determining a load power of the power supply. In such an implementation, the method may also include, when the determined load power is greater than a first threshold load power, providing the load power to the load at the same time from both the power supply and the interim power source, and when the determined load power is less than a second threshold load power, providing the load power to the load from the interim power source.

The method may also be implemented to further include, when the determined input voltage is less than a second threshold voltage, turning off the power supply. In such an implementation, the method may also include, when the determined input voltage is not less than the first threshold voltage and is not greater than a third threshold voltage and the determined load power is not less than the first threshold load power and is not greater than the second threshold load power, providing the load power to the load from the power supply. The method may also be implemented such that the second threshold load power is 40% of the first threshold load power, the first threshold voltage is 80% of a predetermined nominal input voltage, the second threshold voltage is 40% of the predetermined nominal input voltage, and the third threshold voltage is 120% of the predetermined nominal input voltage.

In accordance with a third example embodiment of the present invention, a device is provided. The device includes an isolated AC/DC power supply including an output coupled to an external load. The device also includes a control circuit configured for determining a load power of the external load, and when the determined load power is less than a first threshold load power, providing the load power to the external load from an interim power source.

Also the foregoing third example embodiment may be implemented to include one or more of the following additional features. The device may also be implemented such that the isolated AC/DC power supply is a uni-directional power supply configured to transfer power from an input of the isolated AC/DC power supply to the external load. The device may also be implemented such that the control circuit is further configured for, when the determined load power is greater than a second threshold load power, providing the load power to the external load at the same time from both the power supply and the interim power source.

The device may also be implemented such that the control circuit is further configured for determining an input voltage of the power supply. In such an implementation, the control circuit may also be configured for, when the determined input voltage is less than a first threshold voltage and is not less than a second threshold voltage, providing the load power to the external load at the same time from both the power supply and the interim power source. The device may also be implemented such that the first threshold load power is 40% of the second threshold load power.

The device may also be implemented such that the control circuit is further configured for, when the determined input voltage is less than the second threshold voltage, turning off the power supply. In such an implementation, the control circuit may also be configured for, when the determined input voltage is not less than the first threshold voltage and is not greater than a third threshold voltage and the determined load power is not less than the first threshold load power and is not greater than the second threshold load power, providing the load power to the external load from the power supply. The device may also be implemented such that the first threshold voltage is 80% of a predetermined nominal input voltage, the second threshold voltage is 40% of the predetermined nominal input voltage, and the third threshold voltage is 120% of the predetermined nominal input voltage.

The device may also be implemented such that the power supply further includes a first stage coupled to the input voltage, a switched-mode stage coupled to the external load, and a link capacitor coupled between the first stage and the switched-mode stage. In such an implementation, the control circuit may be further configured for, when the determined input voltage is less than the first threshold voltage, providing sufficient load power from the interim power source such that a link voltage of the link capacitor is maintained for at least 10 milliseconds at not less than 80% of a predetermined nominal link voltage and at not greater than 120% of the predetermined nominal link voltage.

The device may also be implemented such that the power supply further includes a power factor correction stage. In such an implementation, the control circuit may be further configured for, when the determined input voltage is less than a second threshold voltage, turning off the power supply by turning off a power factor correction stage of the power supply.

The device may also be implemented such that the control circuit is further configured for charging an output capacitor bank coupled across the external load to a predetermined nominal DC output voltage during a start-up sequence. In such an implementation, the control circuit may include a microprocessor, the external load may include a computer server that includes a second processor, and the interim power source may include a battery disposed in the same mechanical housing as the power supply.

In accordance with a fourth example embodiment of the present invention, a system for power control is provided. The system includes a primary-side circuit, including an input coupled to an input voltage, a secondary-side circuit including an output coupled to an external load. The secondary-side circuit further includes a battery and a first microcontroller. The system also includes an AC/DC power supply disposed in the same mechanical housing as the battery. The AC/DC power supply includes a first transformer that couples power from the primary-side circuit to the secondary-side circuit. The first microcontroller includes a sensing input coupled to an output of the battery and to the output of the secondary-side circuit.

Also the foregoing fourth example embodiment may be implemented to include one or more of the following additional features. The system may also be implemented to further include an isolation circuit coupling control signals between the primary-side circuit and the secondary-side circuit. In such an implementation, the AC/DC power supply may be an isolated AC/DC power supply, the primary-side circuit may further include a link capacitor, and the first microcontroller may further include a first control output coupled through the isolation circuit to a primary-side switch circuit of the power supply. In such an implementation, the first microcontroller may further include a second control output coupled to an input of a secondary-side switch circuit of the power supply.

The system may also be implemented to further include an auxiliary power source coupled between the primary-side circuit and the secondary-side circuit, the auxiliary power source including a second transformer including an output coupled to a power input of the first microcontroller. The system may also be implemented such that the primary-side circuit further includes a second microcontroller coupled to the first microcontroller through the isolation circuit, the second microcontroller including a power input coupled to an output of the auxiliary power source and a sensing input coupled to an output of the link capacitor.

The system may also be implemented such that the second microcontroller is configured for determining an input voltage of the power supply. In such an implementation, the power supply may be configured for, when the determined input voltage of the power supply is less than a first threshold voltage and is not less than a second threshold voltage, providing load power to the external load at the same time from both the power supply and the battery.

The system may also be implemented such that the first microcontroller further includes a second sensing input coupled to an output of the link capacitor. The system may also be implemented such that the second transformer includes a pulse transformer, the auxiliary power source further includes an auxiliary winding of the first transformer, and the first microcontroller further includes a power input coupled to the output of the battery for receiving power during a start-up sequence. The system may also be implemented such that the secondary-side circuit further includes a DC-to-DC converter that includes a power input coupled to the output of the battery, a control input coupled to a third control output of the first microcontroller, and an output coupled to the external load.

The system may also be implemented such that the primary-side circuit further includes a bridge rectifier including an input coupled to the power supply, and a power factor correction stage coupled between an output of the bridge rectifier and an input of the link capacitor. In such an implementation, the power factor correction stage may include a transistor, and the secondary-side circuit may further include an output capacitor coupled across the external load.

The system may also be implemented such that the external load includes a computer server that includes a processor, the isolation circuit includes an optocoupler, and the primary-side switch circuit includes pulse width modulation controlled switches. The system may also be implemented such that the first microcontroller is configured for determining a load power of the external load, and the power supply is configured for, when the determined load power is less than a first threshold load power, providing the load power to the external load from the battery.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for power control, comprising:
    determining an input voltage of an isolated AC/DC power supply; and
    when the determined input voltage is less than a first threshold voltage and less than a second threshold voltage, providing load power to a load coupled to an output of the power supply from an interim power source and not the power supply; when the determined input voltage of the power supply is less than the first threshold voltage and is not less than the second threshold voltage, providing the load power to the load at the same time from both the power supply and the interim power source;
    determining the load power of the load;
    when the determined load power is less than a first threshold load power, providing the load power to the load from the interim power source and not the power supply;
    when the determined load power is greater than a second threshold load power, providing the load power to the load at the same time from both the power supply and the interim power source, wherein providing the load power to the load from the interim power source comprises providing the load power from a battery to a computer server comprising a processor, and wherein the power supply and the battery are disposed in a same mechanical housing; and
    charging an output capacitor bank coupled across the load to a predetermined nominal DC output voltage during a start-up sequence.

2. The method of claim 1, wherein the isolated AC/DC power supply is a uni-directional power supply configured to transfer power from an input of the isolated AC/DC power supply to the load.

3. The method of claim 1, wherein the first threshold load power comprises 40% of the second threshold load power.

4. The method of claim 1, further comprising:
    when the determined input voltage is less than the second threshold voltage, turning off the power supply; and
    when the determined input voltage is not less than the first threshold voltage and is not greater than a third threshold voltage and the determined load power is not less than the first threshold load power and is not greater than the second threshold load power, providing the load power to the load from the power supply.

5. The method of claim 4, wherein:
    the first threshold voltage comprises 80% of a predetermined nominal input voltage;
    the second threshold voltage comprises 40% of the predetermined nominal input voltage; and
    the third threshold voltage comprises 120% of the predetermined nominal input voltage.

6. The method of claim 5, further comprising:
    when the determined input voltage is less than the first threshold voltage, providing sufficient load power from the interim power source such that a link voltage of a link capacitor is maintained for at least 10 milliseconds at not less than 80% of a predetermined nominal link voltage and at not greater than 120% of the predetermined nominal link voltage, wherein
the link capacitor is coupled to a first stage of the power supply coupled to the input voltage and the link capacitor is coupled to a switched-mode stage of the power supply coupled to the load.

7. The method of claim 1, wherein the method further comprises:
when the determined load power is not less than the first threshold load power and less than the second threshold load power, providing the load power to the load from the power supply and not the interim power source, wherein the second threshold load power is greater than the first threshold load power.

8. A method for power control, comprising:
determining an input voltage of an isolated AC/DC power supply; and
when the determined input voltage is less than a first threshold voltage and less than a second threshold voltage, providing load power to a load coupled to an output of the power supply from an interim power source and not the power supply; when the determined input voltage of the power supply is less than the first threshold voltage and is not less than the second threshold voltage, providing the load power to the load at the same time from both the power supply and the interim power source;
when the determined input voltage is less than the second threshold voltage, turning off the power supply; and
determining the load power of the load;
when the determined load power is less than a first threshold load power, providing the load power to the load from the interim power source and not the power supply;
when the determined load power is greater than a second threshold load power, providing the load power to the load at the same time from both the power supply and the interim power source;
when the determined input voltage is not less than the first threshold voltage and is not greater than a third threshold voltage and the determined load power is not less than the first threshold load power and is not greater than the second threshold load power, providing the load power to the load from the power supply, wherein providing the load power to the load from the interim power source comprises providing the load power from a battery to the load, and wherein the power supply and the battery are disposed in a same mechanical housing; and
turning off the power supply comprises turning off a power factor correction stage of the power supply.

9. A device, comprising:
an isolated AC/DC power supply comprising an output coupled to an external load;
an interim power source comprising a battery disposed in a same mechanical housing as the power supply; and
a control circuit comprising a microprocessor, the control circuit configured for:
determining an input voltage of the power supply; and
when the determined input voltage is less than a first threshold input voltage and less than a second threshold voltage, providing load power to the external load from the interim power source and not the isolated AC/DC power supply,
when the determined input voltage is less than a first threshold voltage and is not less than the second threshold voltage, providing the load power to the external load at the same time from both the power supply and the interim power source,
determining the load power of the external load,
when the determined load power is less than a first threshold load power, providing the load power to the external load from the interim power source and not the isolated AC/DC power supply,
when the determined load power is greater than a second threshold load power, providing the load power to the external load at the same time from both the power supply and the interim power source,
charging an output capacitor bank coupled across the external load to a predetermined nominal DC output voltage during a start-up sequence, wherein the external load comprises a computer server comprising a second processor.

10. The device of claim 9, wherein the isolated AC/DC power supply is a uni-directional power supply configured to transfer power from an input of the isolated AC/DC power supply to the external load.

11. The device of claim 9, wherein the first threshold load power comprises 40% of the second threshold load power.

12. The device of claim 9, wherein the control circuit is further configured for:
when the determined input voltage is less than the second threshold voltage, turning off the power supply; and
when the determined input voltage is not less than the first threshold voltage and is not greater than a third threshold voltage and the determined load power is not less than the first threshold load power and is not greater than the second threshold load power, providing the load power to the external load from the power supply.

13. The device of claim 12, wherein:
the first threshold voltage comprises 80% of a predetermined nominal input voltage;
the second threshold voltage comprises 40% of the predetermined nominal input voltage; and
the third threshold voltage comprises 120% of the predetermined nominal input voltage.

14. The device of claim 13, wherein:
the power supply further comprises:
a first stage coupled to the input voltage;
a switched-mode stage coupled to the external load; and
a link capacitor coupled between the first stage and the switched-mode stage; and
the control circuit is further configured for, when the determined input voltage is less than the first threshold voltage, providing sufficient load power from the interim power source such that a link voltage of the link capacitor is maintained for at least 10 milliseconds at not less than 80% of a predetermined nominal link voltage and at not greater than 120% of the predetermined nominal link voltage.

15. A device, comprising:
an isolated AC/DC power supply comprising an output coupled to an external load, and a power factor correction stage;
an interim power source comprising a battery disposed in a same mechanical housing as the power supply; and
a control circuit configured for:
determining an input voltage of the power supply; and
when the determined input voltage is less than a first threshold input voltage and less than a second threshold voltage, providing load power to the external load from the interim power source and not the isolated AC/DC power supply, when the determined input voltage is less than a first threshold voltage and is not less than the second threshold voltage, providing the load power to the external load at the same time from both the power supply and the interim power source, when the determined input voltage is less than the second threshold voltage, turning off the power supply by turning off the power factor correction stage of the power supply, determining the load power of the external load, when the determined load power is less than a first threshold load power, providing the load power to the external load from the interim power source and not the isolated AC/DC power supply, when the determined load power is greater than a second threshold load power, providing the load power to the external load at the same time from both the power supply and the interim power source when the determined input voltage is not less than the first threshold voltage and is not greater than a third threshold voltage and the determined load power is not less than the first threshold load power and is not greater than the second threshold load power, providing the load power to the external load from the power supply.

* * * * *

UNITED STATES PATENT AND TRADEMARK OFFICE
CERTIFICATE OF CORRECTION

PATENT NO. : 10,985,661 B2  
APPLICATION NO. : 15/152036  
DATED : April 20, 2021  
INVENTOR(S) : Gerald Deboy It is certified that error appears in the above-identified patent and that said Letters Patent is hereby corrected as shown below:

On the Title Page

Item (72) Inventors, Line 3, delete "Didomenico" and insert --Di Domenico--.

Signed and Sealed this  
Twenty-ninth Day of June, 2021

Drew Hirshfeld  
*Performing the Functions and Duties of the*  
*Under Secretary of Commerce for Intellectual Property and*  
*Director of the United States Patent and Trademark Office*